United States Patent [19]
Hylton et al.

[11] Patent Number: 5,708,961
[45] Date of Patent: Jan. 13, 1998

[54] WIRELESS ON-PREMISES VIDEO DISTRIBUTION USING DIGITAL MULTIPLEXING

[75] Inventors: Denny L. Hylton, Great Falls; Robert D. Farris, Sterling, both of Va.; Stephen J. Flaherty, Upper Marlboro, Md.; Richard G. Backus, Manassas; Faye M. Smith, Alexandria, both of Va.; John Andrew Herhei, Beltsville; Raymond Ian Millet, Bowie, both of Md.; Nolan Marcus Forness, Nokesville; Charles H. Stier, Herndon, both of Va.

[73] Assignee: Bell Atlantic Network Services, Inc., Arlington, Va.

[21] Appl. No.: 516,590

[22] Filed: Aug. 18, 1995

Related U.S. Application Data

[63] Continuation-in-part of Ser. No. 431,940, May 1, 1995, Pat. No. 5,613,190.

[51] Int. Cl.$^6$ .................................................. H04N 7/173
[52] U.S. Cl. .......................... 455/4.2; 455/5.1; 348/7; 348/12
[58] Field of Search .................... 348/6, 7, 8, 9, 348/10, 11, 12, 13, 14, 15, 16, 17; 455/4.1, 4.2, 5.1, 6.1, 6.2, 6.3, 3.1; 370/535; H04N 7/16, 7/173

[56] References Cited

U.S. PATENT DOCUMENTS

| | | |
|---|---|---|
| 4,506,387 | 3/1985 | Walter . |
| 4,509,211 | 4/1985 | Robbins . |
| 4,538,174 | 8/1985 | Gargini et al. ............................ 348/7 |
| 4,882,747 | 11/1989 | Williams . |
| 4,885,766 | 12/1989 | Yasuoka et al. . |
| 4,885,803 | 12/1989 | Hermann et al. . |
| 4,899,370 | 2/1990 | Kameo et al. . |
| 4,916,532 | 4/1990 | Streck et al. . |
| 4,949,187 | 8/1990 | Cohen . |
| 4,963,995 | 10/1990 | Lang . |
| 4,994,909 | 2/1991 | Graves et al. ............................ 358/86 |
| 5,010,399 | 4/1991 | Goodman et al. . |
| 5,012,350 | 4/1991 | Streck et al. . |
| 5,023,931 | 6/1991 | Streck et al. . |
| 5,027,400 | 6/1991 | Baji et al. . |
| 5,057,932 | 10/1991 | Lang . |
| 5,130,792 | 7/1992 | Tindell et al. . |
| 5,132,992 | 7/1992 | Yurt et al. . |
| 5,133,079 | 7/1992 | Ballantyne et al. . |
| 5,231,494 | 7/1993 | Wachob . |
| 5,247,347 | 9/1993 | Litteral et al. . |
| 5,253,275 | 10/1993 | Yurt et al. . |
| 5,559,808 | 9/1996 | Kostreski et al. ................... 370/108 |
| 5,574,966 | 11/1996 | Barzegar et al. .................... 348/13 |
| 5,585,850 | 12/1996 | Schwaller ............................ 348/388 |

*Primary Examiner*—John K. Peng
*Assistant Examiner*—Chris Grant
*Attorney, Agent, or Firm*—Lowe, Price, LeBlanc & Becker

[57] ABSTRACT

A digital network delivers multiplexed channels to a customer premises. Each multiplexed channel contains a digitally multiplexed data stream including digitized broadband information relating to a number of programs. At the customer premise, a shared processing system includes several channel selectors and program selectors. Each channel selector selects one of the multiplexed channels, and each program selector selects digitized broadband information relating to a selected program from a selected channel. A multiplexer combines the selected digitized broadband information from the program selectors into a transport stream. A transmitter system, for example comprising a digital modulator, a spread spectrum modulator and a broadcast antenna, provides a wireless broadcast of the digital transport stream throughout the customer premise and possibly one or more near by premises. Terminal devices within range of the broadcast receive the wireless broadcast and process selected digitized broadband information from the transport stream to present information relating to a selected program, e.g. on an associated television set.

31 Claims, 10 Drawing Sheets

PACKET HEADER

| SYNC BYTE | FLAGS | PACKET ID | MISC FLAGS |

188 BYTE MPEG II PACKET

| PACKET HEADER | ADAPTATION FIELD (OPT.) | PAYLOAD (IF ANY) |

FIGURE 2

| TERM. | PMT | VIDEO | AUDIO | PN |
|-------|-----|-------|-------|----|
| A | 3 | 5 | 7 | 1 |
| B | 4 | 6 | 8 | 2 |
| C | 9 | 10 | 17 | 3 |
| D | 11 | 12 | 15 | 4 |

WIRELESS ON-PREMISES VIDEO DISTRIBUTION USING DIGITAL MULTIPLEXING

CROSS-REFERENCE TO RELATED APPLICATION

This application is a continuation-in-part of U.S. patent application Ser. No. 08/431,940, filed on May 1, 1995, (Attorney Reference No. 680-102), now U.S. Pat. No. 5,613,190.

TECHNICAL FIELD

The present invention relates to wireless distribution of broadband digital signals, and possibly associated signaling data, within one or a small number of customer premises.

BACKGROUND ART

Distribution of full motion video data has evolved from early television broadcasting and cable distribution networks to direct broadcast satellite television. Recently, several different wideband digital distribution networks have been proposed for offering subscribers an array of video services, including true Video On Demand service. The following U.S. Patents disclose representative examples of such digital video distributions networks: U.S. Pat. No. 5,253,275 to Yurt et al., U.S. Pat. No. 5,132,992 to Yurt et al., U.S. Pat. No. 5,133,079 to Ballantyne et al., U.S. Pat. No. 5,130,792 to Tindell et al., U.S. Pat. No. 5,057,932 to Lang, U.S. Pat. No. 4,963,995 to Lang, U.S. Pat. No. 4,949,187 to Cohen, and U.S. Pat. No. 4,506,387 to Walter. For example, Litteral et al. U.S. Pat. No. 5,247,347 discloses a digital video distribution network providing subscribers with access to multiple Video On Demand service providers through the public switched telephone network.

Existing analog and cable television networks and all of the digital networks disclosed in the above cited patents require some form of cabling or wiring through the customer premises to at least one receiver or terminal device on the customer premises. For example, in the Litteral et al. system, on-premises wiring extends from an ADSL multiplexer at the telephone network interface device to a terminal associated with the one television serviced by the ADSL line. In many instances, the installation of such facilities within the customer premises involves a major construction project and expense and attendant inconvenience to the owner of the premises. After initial installation, if the customer desires to add another receiver or move a receiver from one location to another within the premises, the customer often must call the network operating company and have trained personnel dispatched to install new cabling or wiring together with new connectors and/or interface devices at the new terminal location. Each such later installation incurs new expense and inconvenience.

A number of patents have proposed various schemes for wireless distribution of information of one sort or another. For example, Robbins U.S. Pat. No. 4,509,211, issued Apr. 2, 1985, describes an electrical system that utilizes an extended infrared radiation link for remote control, such as a TV selector or for data communication.

Williams U.S. Pat. No. 4,882,747, issued Nov. 21, 1989, describes a teleconferencing system including infrared communication apparatus that provides simultaneous video control at a number of remote teleconferencing sites from a central teleconferencing location.

Yasuoka et al. U.S. Pat. No. 4,885,766, issued Dec. 5, 1989, describes a tele-controller system including a control device that receives and stores incoming commands transmitted through a telephone line. The commands are used to operate various apparatuses such as VCR, air conditioner, lamp, etc., at pre-determined times.

Kameo et al. U.S. Pat. No. 4,899,370 issued Feb. 6, 1990, describes an apparatus enabling remote control of electronic equipment such as a VCR through the use of a remote telephone set. A remote controller will provide wireless, line of sight operation of the VCR in response to a signal from the telephone set.

Streck et al. U.S. Pat. Nos. 4,916,532, 5,012,350 and 5,023,931, issued Apr. 10, 1990, Apr. 30, 1991, and Jun. 11, 1991, respectively, describe the transmission of a wireless signal from a VCR to a TV. The output of the VCR is fed into a transmitter and sent to the TV receiver. These patents also describe several prior art arrangements for transmitting a signal from a VCR to a TV set without linking wiring.

The above cited wireless distribution patents, however, have not addressed problems relating to distribution of broadband digital information and associated signaling within customer premises.

DISCLOSURE OF THE INVENTION

The principal object of the invention therefore is to provide wireless distribution of digital broadband information within a customer premise to thereby address the above-stated problems relating to on-premise distribution.

Assignee of the present case has considered wireless customer premises distribution where a central unit at the point of connection to the network selects a channel from those supplied by the network. The selected network channel is retransmitted within the customer premise on an RF channel. If the transmitted channel contains multiple programs, the selection of an individual program is performed by the set-top terminal device before presentation thereof via the associated television receiver. In such a system, if there are multiple televisions serviced by the system, then a corresponding number of network channels are retransmitted within the customer premise. One such system serving a plurality of subscribers with separate channel transmissions for each terminal requires an inordinate number of transmitters, i.e. a separate transmitter for each terminal. Separate transmitters are expensive and add to the complexity of the common or shared transmitting system at the point of connection to the network.

Also, such multiple channel transmission uses up a scarce resource, wireless channel capacity. If a number of such wireless systems operate in close proximity to each other, there may not be enough channels available to service all of the terminals without destructive interference. Spread spectrum wireless transmission may permit more transmitters to operate on the same spectrum within a given area, but each additional transmitter uses a different one of a limited number of orthogonal (non-interfering) spreading codes. Also, increased numbers of transmissions appear as increased background noise to each receiver making low-powered transmission and reception more difficult.

An additional object of the present invention therefore is to provide wireless distribution to a plurality of terminal devices from a common transmitter utilizing a single channel of wireless broadcast transmission.

The present invention provides apparatus and methods for achieving the above stated objects. Specifically, a shared processing system receives a plurality of multiplexed channels, e.g. from one of several exemplary broadband digital networks. Each multiplexed channel contains a digitally multiplexed data stream including digitized broadband information relating to a plurality of programs. The shared processing system includes a plurality of channel selectors. Each channel selector selects one of the received multiplexed channels. A plurality of program selectors process the selected channels. Specifically, each program selector selects digitized broadband information relating to a selected program from a channel selected by one of the channel selectors. A multiplexer multiplexes the selected digitized broadband information from the program selectors into a transport stream. A transmitter system provides a wireless broadcast of the digital transport stream throughout the premises. The distribution system also includes a plurality of terminal devices. The terminal devices receive the wireless broadcast of the digital transport stream and process selected digitized broadband information from the transport stream to present information relating to a selected program.

Because of the selection of the individual programs in the shared processing system and the multiplexing thereof into the transport stream for wireless transmission, only one wireless transmission channel is needed to service a plurality of terminal devices. The wireless channel may be a broadband RF channel, such as a 6 MHz wide channel. Preferably, the transmission system utilizes spread spectrum modulation, and the terminal devices include corresponding spread spectrum receiver circuitry.

The precise selection circuitry used in the shared processing system depends on the channelization utilized on the particular type of network. For example, if the system receives frequency multiplexed RF channels carrying digitally modulated transport streams, then the channel selectors comprise RF channel tuners and digital receivers for demodulating the transport streams from selected RF channels. If the system receives time division multiplexed channels, e.g. a plurality of DS3 channels, then the channel selectors comprise appropriate time division channel demultiplexers. Similarly, if the digital streams on the multiplexed channels contain packet multiplexed program signals, then the program selectors comprise packet data demultiplexers, e.g. MPEG demultiplexers. If the digital streams on the multiplexed channels contain asynchronous transfer mode (ATM) cell virtual circuits or channels for the individual programs, then the program selectors comprise ATM demultiplexers.

By choosing the appropriate combination of selectors, the shared processing circuitry can be adapted to a variety of digital broadband networks. The wireless transmission preferably utilizes a common multiplexing technique and one modulation scheme to permit the shared processing system to communicate with a standardized set-top terminal, which need not be modified to communicate through the shared processing system on different broadband networks.

In the preferred embodiments, the shared processing system also includes a wireless signaling data transceiver communicating signaling information to and from the set-top terminals. The wireless signaling data transceiver supplies messages from the terminals, for example relating to program selections, to a controller. In response, the controller provides appropriate instructions to the channel selector and the program selector. The controller may also provide instructions to the multiplexer and/or spread spectrum codes to the modulator.

If the digital broadband network provides interactive services, then the shared receiving system includes a modem or the like for communication of signaling information via the network. For example, the wireless transceiver and controller will relay interactive service messages from the terminals through the modem upstream over the digital broadband network. In response, the network may transport back selected broadband information which the shared processing system transmits to a terminal involved in an interactive session.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

FIG. 2 shows an exemplary structure of an MPEG II type data packet.

BEST MODE FOR CARRYING OUT THE INVENTION

Figure 1:
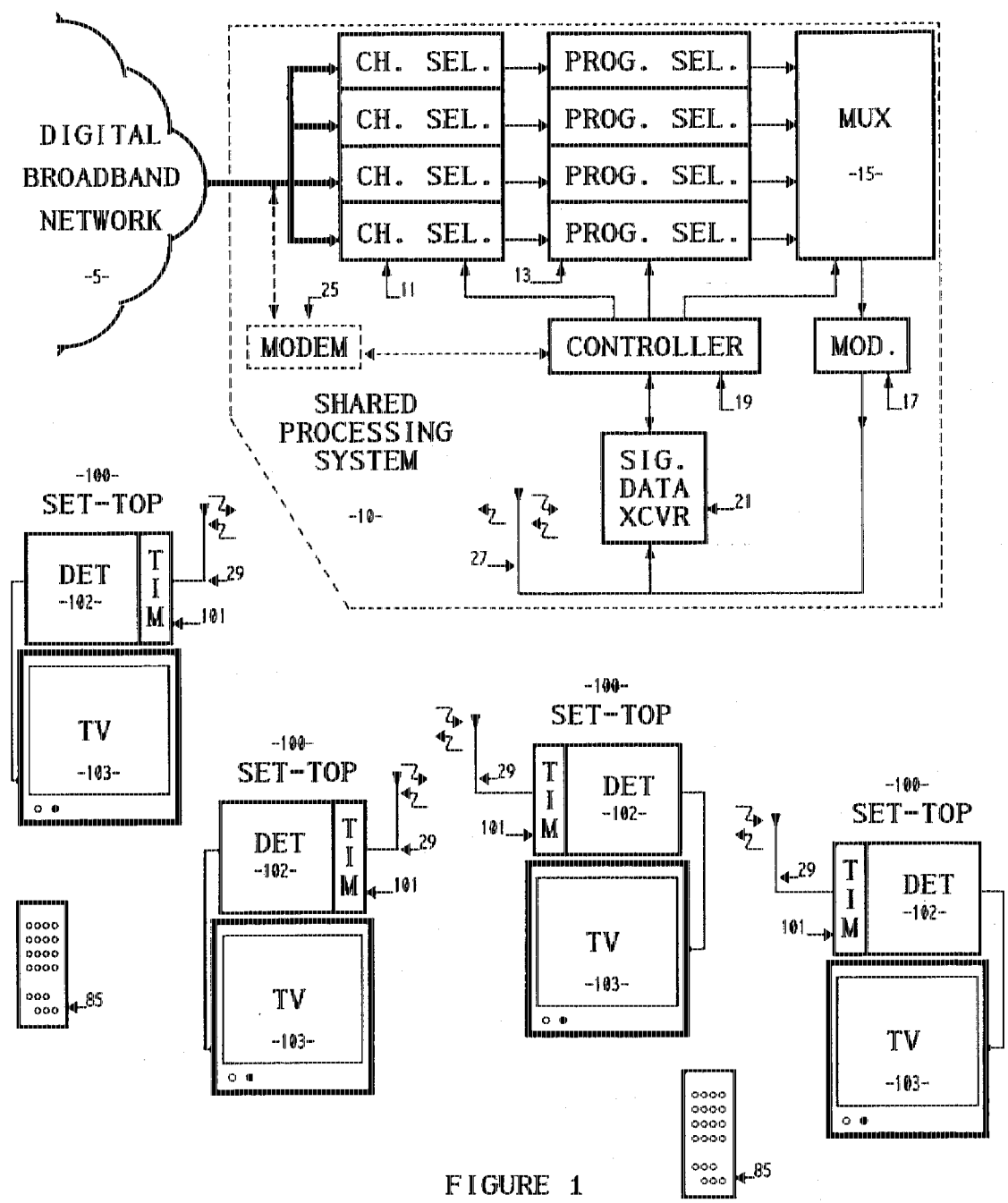
FIG. 1 is a high level functional diagram of a system in accord with the present invention.

FIG. 1 is a block diagram of a system for supplying broadband signals and possibly narrowband signaling information from a digital network 5 to a number of set-top terminals 100 and associated televisions 103. The illustrated system distributes the signals utilizing wireless transmissions between a shared processing system 10 and the set-top terminals 100. Stated briefly, the shared processing system selects program signals from those available on the network 5 for each of the terminals 100, digitally multiplexes those signals together in a single stream and broadcasts that stream throughout the premises. The shared processing system 10 also communicates signaling information with the set-top terminals to identify programs that uses select and to provide any information to the set-top terminals 100 needed to permit reception, decoding and presentation of a selected program from the broadcast stream.

The shared processing system 10 may service set-top terminals within a single residence or a number of such terminals in adjoining residences, such as in an apartment building or town-house development. The number of set-top terminals 100 serviced by one shared processing system 10 will depend on the precise digital encoding and modulation techniques used. In the examples discussed below, one shared processing system 10 will support four active set-top terminals 100.

The system 10 may connect to a number of different types of digital broadband networks 5, including hybrid fiber-coax networks, switched digital video type fiber to the curb networks and wireless digital broadcast networks. The preferred architecture of a hybrid fiber-coax network is disclosed in commonly assigned U.S. patent application Ser. No. 08/413,207, filed Mar. 28, 1995 entitled "ATM Packet Demultiplexer for Use in a Full Service Network Having Distributed Architecture" (attorney docket No. 680-116); the preferred architecture for a switched digital video type fiber to the curb network is disclosed in commonly assigned U.S. patent application Ser. No. 08/380,758 filed on Jan. 31, 1995 entitled "VPI/VCI Administration" (attorney docket no. 680-123); and the preferred architecture for a wireless digital broadcast network is disclosed in commonly assigned U.S. patent application Ser. No. 08/405,558 filed Mar. 16, 1995 entitled "Simultaneous Overlapping Broadcasting of Digital Programs" (attorney docket no. 680-130); and the disclosures of those three applications are incorporated entirely herein by reference.

Different types of networks 5 will utilize different transport protocols and signal formats. The shared processing circuitry will include appropriate elements to receive such signals from the particular network and convert the relevant information to a standard format receivable by the terminals 100. The structure and operation of the terminals 100 conforms to those of the shared processing system 10, but need not conform specifically to the protocols and signal formats utilized on the particular network 5.

In accord with the present invention, the shared processing system 10 receives a plurality of channels from the network 5. In one preferred embodiment, the channels are frequency multiplexed broadband RF channels, e.g. 6 MHz channels in the 50–850 MHz range. In another embodiment, these channels are time division multiplexed digital channels, e.g. DS3 rate channels.

Each channel received from the network 5 includes a digital stream containing a plurality of digitized and compressed broadband programs, such as audio/video programs. In one preferred embodiment described below, the digital stream is a transport stream containing packets of information for the multiple programs. In a second preferred embodiment, the digital stream is an asynchronous transfer mode (ATM) cell stream including a virtual circuit or channel for each program transported in the cell stream.

For each terminal 100 serviced by the system 10, the shared processing system 10 includes one channel selector 11 and one program selector 13. The structure and operation of the channel selector and program selector depend on the type of network 5 from which the processing system 10 receives programming and the type of channelization utilized on that network. The channel selector 11 selects one of the channels received from the network 15 and supplies the digital stream from that channel to the corresponding program selector 13. The program selector 13 in turn selects the digitized and compressed information for one selected program from the digital stream. The program selectors thus supply digital information for a plurality of individual selected programs to a multiplexer 15.

In one embodiment, the program selectors output program information in packetized form. In another embodiment, the multiplexer 15 packetizes the program information for the selected programs. In either case, the multiplexer 15 combines the packets for all of the selected programs into one digital transport stream. The packets in the multiplexed stream include identifiers. If the network 5 utilizes a similar packet technology and the identifiers are compatible, the program selector and multiplexer 15 may pass the packets through without modification of the packets or the identifiers contained therein. Alternatively, the multiplexer may insert new identifiers assigned to the individual terminals serviced by the shared processing system 10.

The multiplexer 15 supplies the multiplexed transport stream containing the selected programs to a modulator 17. The modulator 17 and an antenna 27 serve as a wireless broadcast transmission system, in the downstream or forward direction. The modulator 17 modulates the transport stream into an RF channel for wireless broadcast via the antenna 27. Specifically, the modulator will modulate the digital information, e.g. onto an intermediate frequency carrier, for example using QAM or other digital modulation techniques discussed in more detail below. The modulator 17 then remodulates or up-converts the signal to the actual channel to be broadcast. A number of modulators may be used for this purpose. The modulator may modulate the transport stream into an available 6 MHz wide RF channel, the same as or similar to a broadcast TV channel. Different systems 10 serving different groups of set-top terminals 100 would utilize different channels.

Preferably, the modulator 17 is a spread spectrum modulator. Specifically, the final modulation into the signal for broadcast results in a spreading of the energy of the modulated signal over a wide frequency range. The spreading is dependant on a code used in the spread spectrum modulation. Different modulators utilize the same spectrum but with different spreading codes. Receivers distinguish transmission from different modulators by demodulating signals using the same code as used by the respective modulators.

Spread spectrum communication systems can be implemented as multiple access systems in a number of different ways. One type of multiple access spread spectrum system is a code division multiple access (CDMA) system. CDMA spread spectrum systems may use direct sequence (DS-CDMA) or frequency hopping (FH-CDMA) spectrum spreading techniques. FH-CDMA systems can further be divided into slow frequency hopping (SHF-CDMA) and fast frequency hopping (FFH-CDMA) systems. In SFH-CDMA systems, several data symbols representing a sequence of data bits to be transmitted modulate the carrier wave within a single hop; in FFH-CDMA systems, the carrier wave hops several times per data symbol.

In a SHF-CDMA system, multiple communication channels are accommodated by the assignment of portions of a broad frequency band to each particular channel. For example, a communication between two communication units in a particular communication channel is accomplished by using a frequency synthesizer to generate a carrier wave in a particular portion of a predetermined broad frequency band for a brief period of time. The frequency synthesizer uses an input spreading code to determine the particular frequency from within the set of frequencies in the broad frequency band at which to generate the carrier wave. Spreading codes are input to the frequency synthesizer by a spreading code generator. The spreading code generator is periodically clocked or stepped through different transitions which causes different or shifted spreading codes to be output to the frequency synthesizer. Therefore, as the spreading code generator is periodically clocked, the carrier wave is frequency hopped or reassigned to different portions of the frequency band. In addition to hopping, the carrier wave is modulated by data symbols representing a sequence of data bits to be transmitted. A common type of carrier wave modulation used in SFH-CDMA systems is M-ary frequency shift keying (MFSK), where $k=\log_2 M$ data symbols are used to determine which one of the M frequencies is to be transmitted.

Multiple communication channels are allocated by using a plurality of spreading codes. As a result, transmitted signals are in the same broad frequency band of the communication channel, but within unique portions of the broad frequency band assigned by the unique spreading codes. These unique spreading codes preferable are orthogonal to one another such that the cross-correlation between the spreading codes is approximately zero. Particular transmitted signals can be retrieved from the communication channel by despreading a signal representative of the sum of signals in the communication channel with a spreading code related to the particular transmitted signal which is to be retrieved from the communication channel. Further, when the spreading codes are orthogonal to one another, the received signal can be correlated with a particular spreading code such that only the desired signal related to the particular spreading code is enhanced while the other signals are not enhanced. According to the preferred embodiment of the invention, frequency hopping spread spectrum is utilized.

In accord with the present invention, a modulator 17 in a first shared processing system 10 on one customer premises would utilize one unique spread spectrum code. Corresponding demodulators in the set-top terminals 100 on that premises would demodulate signals in the relevant spectrum using the same spreading code. A modulator 17 in a second shared processing system 10 on one customer premises would utilize a second unique spread spectrum code. Corresponding demodulators in the set-top terminals 100 on that second premises would demodulate signals in the relevant spectrum using the second spreading code. To each demodulator, transmissions utilizing spreading codes other than those utilized by the particular demodulator appear as background noise which the demodulator effectively filters out during the demodulation process.

The use of spread spectrum for the on premise distribution of the invention presents numerous advantages. A primary advantage is the dilution of the signal energy so that while occupying a large bandwidth, the amount of power density present at any point within the spread signal is very slight. The dilution may result in the signal being below the noise level of a conventional receiver, and thus invisible to it, while it can be received with a spread spectrum receiver. Another advantage is that the spread spectrum receiver can reject strong undesired signals while providing high quality reception of the signal having the correct spreading sequence. Multiple spread spectrum systems can operate independently of each other within the same band. Thus multiple independently tuned television sets may operation without interference within the same premise and in adjoining premises.

Thus, in accord with the present invention, the set-top terminals 100 serviced by a particular shared processing system 10 receive and demodulate wireless transmission signals broadcast from modulator 17 via antenna 27. Each set-top terminal 100 connects to an antenna 29. The set-top terminal comprises a Transport Interface Module (TIM) and a Digital Entertainment Terminal (DET).

The set-top terminal 100 processes selected information from the wireless broadcast channel to produce signals capable of presenting information from that channel to a user in humanly perceptible form, e.g. to drive a standard television set 103 to display selected video programming. The TIM 101 performs the necessary wireless signal processing to capture the digital transport stream from the received wireless broadcast signal. The DET 102 performs the actual decoding to produce the output signals from the information. The DET 102 also includes the primary intelligent control processor for overall control of the operation of the set-top terminal 100.

The TIM 101 provides upstream wireless signaling transmissions to the shared processing system 10, e.g. for selection, and may process downstream wireless signaling information. A controller 19 controls all operations of the shared processing system 10 as well as two-way signaling communications via the network 5, if available through the particular type of network. The controller 19 exchanges signaling messages with the set-top terminals 100 via signaling data transceiver 21 and the antenna 27. The signaling data transceiver 21 is an RF modem utilizing a frequency band separate from that used for the broadband transmission from the modulator 17. For example, the transceiver 21 may comprise a Ricochet modem sold by Metricom, for wireless packet data service in the 902–928 MHz range. This type of modem utilizes a frequency hopping spread spectrum modulation to communicate packet data.

In operation, a user will activate a remote control 85 to select a program. The DET 102 will receive the program selection from the remote control and compile a message identifying the selected program. The DET 102 supplies the message to the TIM 101 for wireless transmission from antenna 29. The message is received at the shared processing system 10 via the antenna 27 and demodulated by transceiver 21. The transceiver 21 supplies the message to the controller 19 for processing. The controller will recognize the message as relating to a channel selection by the particular one of the set-top terminals 100.

The controller 19 stores a program map for the programs carried on the particular network 5. For each program service, the map includes information defining a logical network channel number for the program. The logical channel number is the channel the DET 102 will display on a front panel display (not shown) or on the screen of the associated television set 103 and is the number that the user inputs via the remote control 85 to select the program and the set-top 100 forwards to the shared receiving system as channel selection information. For each program, the map also includes information identifying the network channel that carries the program as well as information needed to uniquely identify the program within the multiplexed digital data stream on the particular channel.

Using the mapping information, the controller 19 instructs the channel selector 11 serving the set-top 100 that sent the request to select the channel from network 5 that is carrying the program selected by the user. The controller 19 also instructs the program selector 13 serving the set-top 100 that sent the request to select the program information from the digital stream on the selected channel. The controller 19 may also provide instructions to the multiplexer 15 regarding the packet identifiers to be used when multiplexing the program into the transport stream for transmission to the set-top 100 that sent the request. Consequently, the multiplexed transport stream output by the multiplexer 15 will include the digitized and compressed program information for the program selected by the user. The modulator modulates the transport stream for wireless broadcast via antenna 27, as discussed above.

The antenna 29 connected to the user's set-top terminal 100 receives the broadcast signal transmission and supplies the signal to the TIM 101. As discussed more below, the TIM demodulates the signal and supplies the transport stream to the DET 102. The DET 102 will have stored the necessary packet identifiers in memory. The packet identifiers may be permanently assigned to one DET, as in a simplified example discussed below. Alternatively, the controller 19 may dynamically allocate packet identifiers and provide the packet identifier(s) to the DET 102 via a wireless signaling data communication, in response to the program selection. A variety of other techniques may be used for insuring that the necessary identifiers are stored by the DET 102 by the time that the DET 102 begins decoding the selected program. In any case, the DET 102 utilizes the packet identifier(s) to capture and process digitized and compressed information for the selected program from the transport stream output by the TIM 101. In response to the processed information, the DET 102 preferably produces signals to drive an audio/video device such as a TV 103 and/or an associated video cassette recorder (not shown).

Some types of digital broadband networks, such as the wireless network disclosed in the above incorporated Ser. No. 08/405,558 (attorney docket no. 680-130) application, provide only downstream broadband services. There may be no provision for signaling communications, such as for interactive services. However, if the network 5 carries interactive services, then the network typically will provide at least upstream transport for signaling information. The exemplary networks disclosed in the other commonly assigned applications incorporated above provide upstream signaling communications as well as out-of-band transport for low-speed signaling information in the downstream direction. The shared processing system 10 therefore may include a modem 25 or other appropriate data communication device, for carrying upstream and possibly downstream signaling messages to and from the network 5.

For such an interactive service, the set-top terminal receives and transmits user input information to the controller 19 in the shared processing system 10 in the same manner as for program selections. The controller 19, however, recognizes the messages as requiring transmission over the network 5 and forwards those messages to the modem 25. The modem 25 formats and modulates the information as appropriate for the particular type of network 5.

In the reverse direction, the modem 25 receives signaling transmissions from appropriate channels on the connection to the digital broadband network 5. The modem 25 demodulates the signaling messages and converts the messages as necessary to a format appropriate for forwarding to the controller. Certain signaling information from the network 5 may be intended for the controller 19, e.g. decryption information and/or information mapping the programs to channels and program streams carried on the network. Some messages received through the modem 25 from network 5 are intended for a specific set-top terminal, e.g for text or graphic overlay display over the video on the TV 103. The controller 19 forwards such messages to the signaling data transceiver 21 for wireless transmission to the particular set-top terminal 100.

As shown by the above overview, the use of wireless distribution on the premises eliminates the need to install cabling or wiring from the point that the network 5 enters the premises to the individual terminals 100. Also, if the user so desires, the user can move the set-top 100 and associated television set 103 to a new location within range of the shared processing system 10, without any need to modify the wiring or install any new cables.

A more detailed description of several preferred embodiments follows.

Broadband material intended for transport through the preferred embodiments of the network 5 is encoded and packetized in accord with a specified protocol or standard, such as DIGICIPHER™. The preferred embodiments utilize MPEG (moving pictures expert group) encoding. A detailed discussion of that standard may be found in International Organisation for Standardization Organisation Interationale de Normalisation, "Coding of Moving Pictures and Associated Audio", ISO/IEC JTC/SC29/WG11, CD ISO/IEC 1-13818, February 1994, and a brief summary of MPEG II processing follows.

MPEG is a bi-directional predictive coding compression system, utilizing discrete cosine transformation (DCT) processing to digitize and compress video information. For video information, the encoder will develop reference (I) frames, predictive (P) frames and delta (B) frames.

The number of frames to be coded for each I frame is set in the standardized MPEG syntax, e.g. one reference frame for each group of fifteen frames, or every half second. A prediction is made of the composition of a video frame, termed a P frame, to be located a specific number of frames forward and before the next reference (I) frame, this specific number also is set in the MPEG syntax. Information from previous video frames as well as later video frames is used in formulating the prediction. "Delta" or "B frame" information is developed for coding the video frames between the actual and predicted frames, also by looking at frames in both directions. Rather than updating a whole frame, only the changed (or delta) information is provided for the delta video frames. Typically, between I frames, the frame sequence consists of a repetitive succession of two B frames followed by one P frame. MPEG II also specifies digitizing and compressing techniques for accompanying audio information.

The MPEG II standard provides a standardized format for packetizing the compressed audio and video information and for other data. The preferred networks 5 supply MPEG II packet streams to the shared processing system 10. Also, in accord with the present invention, the multiplexer 15 is an MPEG II compliant multiplexer for multiplexing a plurality of MPEG digitized/compressed programs into one transport stream.

Under the MPEG II standard, incoming individual digitized and compressed video and related audio signals are packetized into respective Video and Audio Packetized Elementary Streams (PES). The video and audio PES's from a plurality of sources of programming may be combined with similarly packetized data into a transport stream for transmission.

Each frame of compressed audio or video program information is broken down into a series of transport packets. Although the frames can vary in length, e.g. between a full reference I-frame and a delta B-frame, the transport packets have a fixed 188 byte size (FIG. 2). Thus, different frames are broken down into different numbers of MPEG transport packets. For example, in a 6 Mbits/s encoding system, a group of frames consisting of a total of 15 frames for one-half second of video (one I frame and a number of P and B frames), breaks down into approximately 2000 transport packets (or 4000 transport packets per second).

The MPEG II standard also permits transport of private or user data as payload information. Data, e.g. in Ethernet protocol form, is repacketized into MPEG II transport packets.

As discussed in more detail below, each packet includes a packet identifier (PID) value. In accord with the standard an encoder or data module inserts the assigned PID into the packet as part of the packet formatting process. In the system of FIG. 1, this function is performed by the MPEG II compliant multiplexer 15.

Different PID values are assigned to different programs and content. For example, one program may have a first PID for video, a second PID for audio and a third PID for related data (e.g. closed captioning). The same stream may also contain private data not directly related to the program, e.g. application or operating system software, and a different PID is assigned to packets transporting that data. In actual practice, programs typically have additional PID values, e.g. for additional audio tracks and the like.

As shown in FIG. 2, each 188 byte transport stream packet consists of two or three sections, a 4 byte packet header section, a payload section and/or an optional adaptation field. The header information includes, inter alia, a synchronization byte, a variety of different flags used in reconstruction of the frames, and a thirteen bit program identification (PID) number. PID value 0 is reserved as an indication that the packet includes program association table data (mapping program numbers (PNs) for individual programs into PID values for program maps for those programs). PID value 1 is reserved for identification of packets containing conditional access data, such as encryption information. Other program identification numbers are utilized to identify transport packets with the program source from which they originate and the type of program information contained therein.

Periodically, a transport packet for each audio/video program will also include a program reference clock (PRC) value within the optional adaptation field. In a typical 6 Mbits/s MPEG II encoding system, the PRC is present in approximately 10 out of every 4000 video transport packets. When included, the optional adaptation field includes a section for miscellaneous flags, such as discontinuity counter, private data flag, etc. One of the possible flags carried in this portion of the adaptation field is a program clock reference (PCR) flag. The adaptation field (AF) also includes a section designated for AF options. One of the options this section may carry is the PCR value.

On decompression, the decoder in the DET 102 in sequence reconstructs the frames for a particular program from packets bearing the appropriate PID values, uses the reference frame to form the prediction frames, and then uses the prediction frames and delta information to construct full frames from the delta frames.

As noted, the preferred embodiments of the networks 5 and the on-premises system of FIG. 1 utilize MPEG encoding, therefore the mux 15 is an MPEG II compliant multiplexer. The multiplier packetizes the program signals from the selectors 13 and multiplexes the resultant packets into an MPEG II transport stream for wireless broadcast via modulator 17 and antenna 27. As part of this processing, the multiplexer 15 must manage the PID values of the packets.

Figures 3A, 3B:
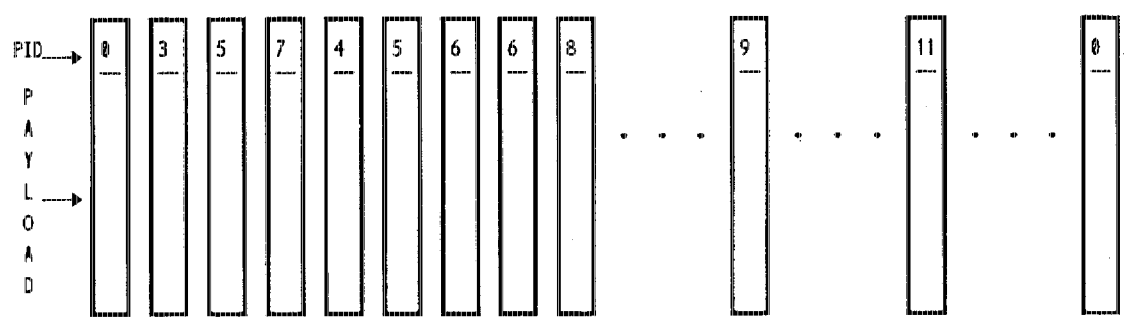
FIG. 3A shows a simplified example of a packet identifier (PID) assignment table and associated program number (PNs) used to explain packet multiplexing of programs for wireless on-premises transmission in accord with the present invention.
FIG. 3B is a simplified illustration of an MPEG II transport stream using the PID value table of FIG. 3A.

FIG. 3A includes a simplified example of a PID value assignment table used by the multiplexer 15. As discussed more later, this drawing also shows program number (PNs) assigned to each set-top terminal 100 serviced by the shared receiving system 10.

In at least one embodiment, the multiplexer 15 receives MPEG streams of compressed video and audio and any accompanying data for each selected program. In the example shown, the system 10 services four set-top terminals 100, and the multiplexer receives four selected programs. Essentially, one program corresponds to each terminal. In the PID value mapping example of FIG. 3A, the PID values for one program are assigned to one terminal 100.

In the example, a first set-top terminal 100, identified as terminal 'A' in the table, is assigned three PID values. The first PID value is a value for the program mapping table (PMT) for that terminal's program. In the example, terminal A is assigned PID value 3 for its PMT. The video and audio streams for the selected program are assigned PID values 5 and 7 respectively. As part of its processing, the multiplexer 15 will construct a program map table, in a packet identified by PID 3, indicating that the video and audio PIDs are 5 and 7. When packetizing the video and audio bit streams from the program selector assigned to terminal A, the multiplexer will insert the PID values 5 and 7, respectively.

In the illustrated example, the PMT for terminal 'B' is identified by PID 4, and the video and audio streams for the selected program for that terminal are assigned PID values 6 and 8 respectively. As part of its processing, the multiplexer 15 will construct a program map table, in a packet identified by PID 4, indicating that the video and audio PIDs are 6 and 8 for the program selected by terminal B. When packetizing the video and audio bit streams from the program selector assigned to terminal B, the multiplexer will insert the PID values 6 and 8, respectively. The table in FIG. 3A shows similar PID value assignments for terminals C and D, and the multiplexer 15 will utilize those PID values in a similar manner when processing the bit streams for the programs selected for those terminals.

The simplified example of FIG. 3A shows only the PMT PID value, the video PID value and one audio PID value for each program. As noted above, a plurality of PID values are used for each program. An actual implementation would include additional PID value assignments, for data such as closed captioning and/or user data intended for a particular terminal and possibly for alternate audio tracks.

FIG. 3B provides a simplified illustration of an MPEG II transport stream, such as produced by the multiplexer 15, using the PID value table of FIG. 3A. As part of its processing, the multiplexer 15 will construct an MPEG II packet identified by PID 0. The PID 0 packet contains a program association table. Such a table maps program numbers (PNs) into the PID values for the PMT packets for the programs carried in the stream. In the present example, the multiplexer 15 will construct the program association table. One program number is assigned to each of the four terminals, and the program association table therefore identifies the PMT packet PID value assigned to each terminal. The MPEG multiplexer 15 combines the packets for the video, audio, etc. for the four programs together with the table and mapping packets constructed by the multiplexer (e.g. PID 0 and PMT packets) to form a single transport stream, sometimes referred to as a 'super transport stream'.

As illustrated, the order of the packets is essentially arbitrary and is not specifically related to the PID values given to the individual packets. In a typical sequence, control packets such as the PID 0 packet and the PMT packets appear periodically. The audio, video and data packets for each program are inserted in the stream as the multiplexer receives and compiles enough payload data for each type of packet on the input form the particular program selector. The MPEG standard specifies additional syntax for an MPEG II super transport stream, and the multiplexer inserts additional packets (not shown) as necessary to conform to the standard syntax.

In the preferred embodiments, the individual programs are encoded at a 6 Mbits/s rate. The transport stream with all appropriate overhead (and possibly some padding) is typically at a 27 Mbits/s rate. At each set-top terminal 100, the TIM 101 will demodulate the signal for the wireless broadcast channel utilized by the shared receiving system 10. The TIM 101 hands off the 27 Mbits/s transport stream to the DET 102. The DET 102 knows or is told of the program number currently assigned to it. The DET 102 therefore can capture the program association table from the PID 0 packet to identify the PID value for the PMT packet for its selected program. Alternatively, the DET 102 may receive the PID for the PMT packet via the signaling channel or otherwise be preprogrammed with that value. Using the PMT packet information, the DET 102 identifies the PID values for packets containing video, audio and data (if any) for the programs its user selects and can use that information to capture and process the selected program information contained in the multiplexed transport stream.

Continuing the simplified example of FIG. 3A and 3B, assume that terminal A is assigned program number 1. The DET 102 obtains the program association table from the PID 0 packet and uses the PN value 1 to identify PID value 3 for the PMT packet for its program from that table. Using the PMT packet information, the DET 102 identifies a packet bearing PID value 3, i.e. containing the PMT table, and from that table, the DET 102 identifies the PID values 5 and 7 for its video and audio information. Using PID values 5 and 7 the DET 102 captures and processes digitized and compressed program information from the transport stream which corresponds to the programs its user selected.

The set-top 100 is essentially the same regardless of the type of network to which the shared processing system 10 connects. One function of the shared processing system 10 is to convert between signal and channelization formats on the network 5 and formats used by the set-top terminals 100. Preferred network implementations and corresponding implementations of the shared processing system are discussed below. To facilitate an understanding of the wireless on-premise distribution of video, feature it is useful to next consider the structure of the set-top terminal 100 in more detail.

Figure 4:
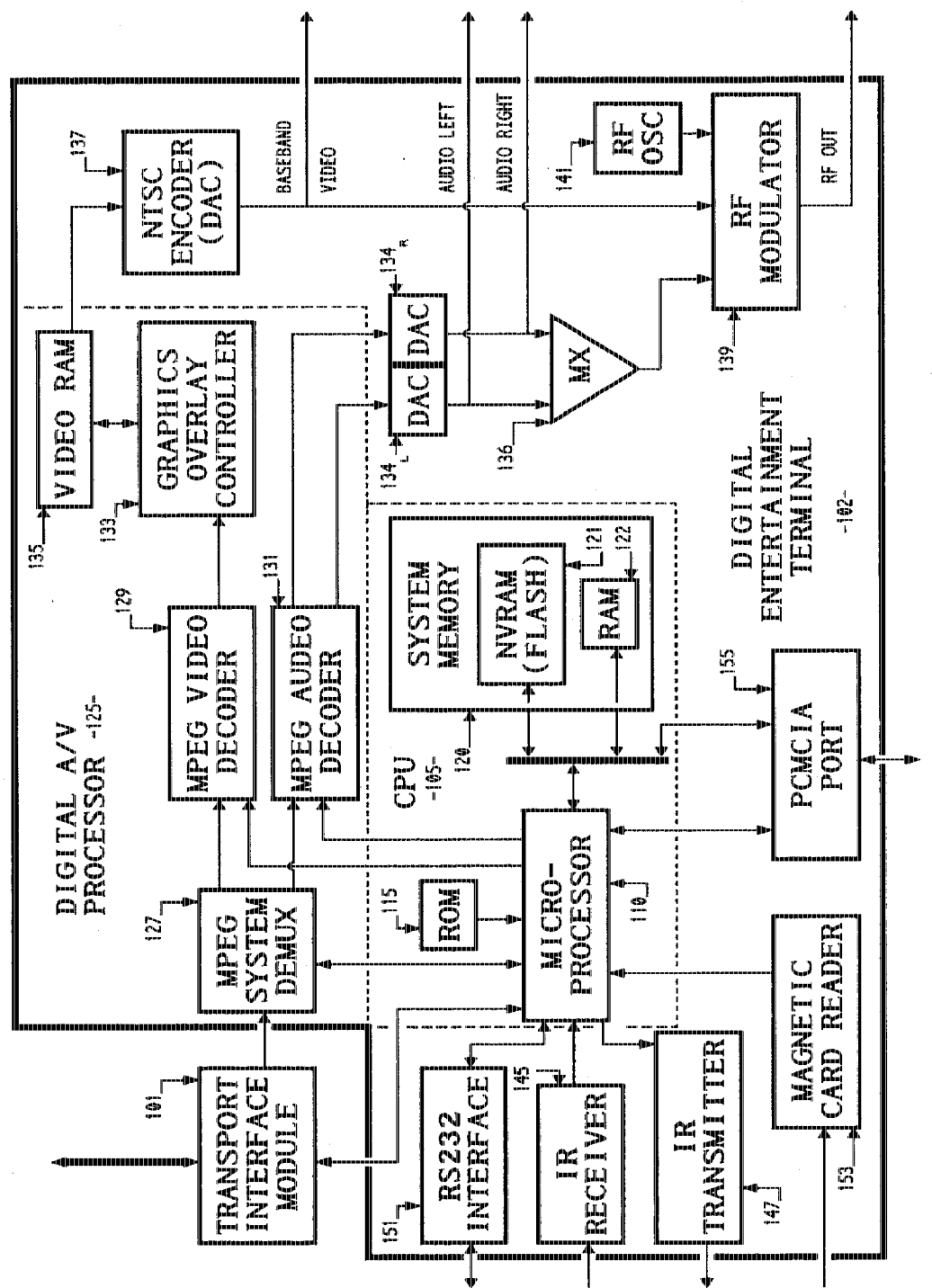
FIG. 4 is a block diagram illustration of a set-top terminal device used in the wireless on-premises distribution system of FIG. 1.

The set-top terminal 102 shown in FIG. 4 will communicate via a number of different types of digital networks, offering broadcast and point-to-point type services, such as disclosed in commonly assigned application Ser. No. 08/413,810 filed Mar. 28, 1995 entitled "Access Subnetwork Controller for Video Dial Tone Networks" (attorney docket no. 680-093B), the disclosure of which is incorporated herein entirely by reference. In addition to wireless implementations, essentially the same set-top 100 may connect directly to the network 5. For wire connected implementations, the terminal would include a network interface module (not shown) in place of the TIM 101. The network interface module provides the actual physical connection to the particular type of network. For example, in a fiber to the home network, the module 101 would include means for two-way conversion between electrical and optical signals and connections to one or more optical fibers for the necessary two-way transmission. However, in a system using wireless on-premises transport in accord with the present invention, the set-top terminal 100 includes Transport Interface Module (TIM) 101 which provides a non-physical communication link. The TIM 101 provides the two-way communication via one (or two) associated antenna 29 (FIG. 1).

The Transport Interface Module 101 also performs any format conversion necessary between signal formats utilized by the wireless transmission between the shared processing system 10 and signal formats used within the DET 102. For example, for broadband information, the TIM 101 will include the necessary demodulation circuitry to capture an MPEG II transport stream from the on-premises wireless transmission. The Transport Interface Module also provides two-way signal conversion and formatting for control signalling between the DET 102 and the shared processing system 10 and for a control signaling channel through the particular network 5 (if available).

In the illustrated embodiment, the Transport Interface Module 101 presents two connections to the DET 102, a high bit rate broadband connection and a low bit rate signaling connection. The broadband connection is a one-way downstream only connection, but the low-bit rate signaling connection is a two-way connection. The Transport Interface Module 101 takes the form of a plug in module. In one embodiment, the module 101 would be similar to a daughter board or option card which can be plugged into a back plane of a personal computer (PC).

The DET 102 includes a CPU 105, comprising a 386, 486, PENTIUM™ or Motorola 6800 Series microprocessor 110 and associated system memory 120. The system memory 120 includes at least 2 mbytes of volatile dynamic random access memory (RAM) 122 and 1 mbyte of non-volatile random access memory (NVRAM) 121. In the preferred embodiment, the NVRAM 121 is a flash memory device. The CPU 105 also includes a read only memory (ROM) 115, either as a separate element connected to the microprocessor 110 as shown or as an element within the microprocessor 110. The ROM 115 stores "loader" programming needed to control wake-up. The non-volatile RAM 121 stores the operating system for the microprocessor 110. In operation, the volatile RAM 122 temporarily stores applications programs for execution by the microprocessor 110 as well as related data files.

A digital audio/video (A/V) signal processor 125, controlled by the CPU 105, produces digital uncompressed audio and video signals from the audio and video MPEG encoded packets received from the network through the interface module 101. The audio/video processor 125 includes an MPEG system demultiplexer 127, an MPEG video decoder 129, an MPEG audio decoder 131, a graphics overlay controller 133 and at least two frames (e.g. 8 mbytes) of video RAM 135.

The MPEG system demultiplexer circuitry 127 recognizes packets in the MPEG data stream received over the broadband channel through the Transport Interface Module 101 and routes the packets to the appropriate components of the DET 102 based on the PID values of the respective packets. For example, the MPEG system demultiplexer 127 circuitry recognizes audio and video packets in the MPEG II data stream and routes those packets to the decoders 129, 131, respectively. The MPEG system demultiplexer 127 routes private data, such as downloaded software, to the microprocessor 110.

The MPEG video decoder 129 decompresses received video packet signals to produce a digital video signal, and the MPEG audio decoder 131 decompresses received audio packets to produce left and right digitized stereo signals. For at least some functions, the MPEG decoders 129, 131 may be controlled in response to signals from the microprocessor 110. The MPEG video decoder 129 will internally include at least two frames (e.g. 8 mbytes) of RAM (not separately shown) for use as a frame reorder buffer during the MPEG video decoding process, and the MPEG audio decoder 131 also may include some buffer memory.

The video RAM 135 is not a specialized "video RAM" as that term is sometimes used in the television art. The RAM 135 is actually a standard digital data RAM, of appropriate size, which is used in the DET to store digitized frames of video data. The RAM within the MPEG video decoder 129 likewise consists of standard digital data RAM.

The graphics display generator produces displays of text and graphics data, such as a selection menu received over the signaling channel, in response to instructions from the CPU 105. The video RAM 135 sequentially receives each frame of digitized, uncompressed video information, as output from the MPEG video decoder 129. The video RAM 135 also receives digital information and read/write control signals from the graphics overlay controller 133 representing the several planes of text and graphics information and combines that information with the frames of decompressed video to produce composite video frames.

The graphics overlay controller 133 and the video RAM 135 actually cooperate to manipulate five different planes of video information, four of which can be active at any one time, to produce the composite video frame output signals. The individual planes comprise the decoded MPEG video frames, a cursor, two graphics/text image planes manipulated by the microprocessor 110 and a backdrop plane. The backdrop plane would be switched in to replace the plane representing the decoded MPEG video frames, e.g. to present a blue background instead of the MPEG video background.

When there are no graphics or text, the composite frames would correspond entirely to the uncompressed received video frames output by the MPEG video decoder 129. When no received video frames are to be output, either when none are received or when they are to be entirely replaced, the information from the graphics overlay generator 133 would specify a background and the active planes of text or graphic information. When received video frames are combined with text and/or graphics, the composite video frames include the uncompressed received video frames with selected pixels thereof replaced with graphics or textual data display pixels specified by the graphics overly controller 133. In this last situation, the graphics overlay controller would deactivate the backdrop plane.

Under certain circumstances, the video RAM 135 also serves to freeze video frames. For example, when a video transmission ends for some reason, the RAM 135 will contain the video and associated graphics information for the frame last received and displayed. The DET 102 can continue to output this frame as a still video output signal for some period of time.

The DET 102 also includes audio and video digital to analog converters and appropriate drivers to produce output signals compatible with a conventional television set. Specifically, the converter and driver circuitry of the DET 100 includes audio digital to analog converters (DAC's) $134_L$ and $134_R$, an audio mixer 136, an NTSC encoder 137, and an RF modulator 139.

The DAC's $134_L$ and $134_R$ receive the uncompressed left and right digitized audio signals output by the MPEG audio decoder 131. In response, the DAC's $134_L$ and $134_R$ produce baseband analog audio signals for output to individual baseband output terminals. The audio mixer 136 also receives the baseband audio signals from the DAC's $134_L$ and $134_R$. The mixer 136 combines the left and right analog audio signals to produce a monaural audio signal as the audio input to RF modulator 139.

The NTSC encoder 137 also performs a digital to analog converter (DAC) function. In response to the digitized video output signals from the video RAM 135, the NTSC encoder 137 produces a baseband analog video signal in standard NTSC format. The baseband NTSC video signal is supplied to an output terminal of the DET 102. The baseband NTSC video signal is also supplied to the RF modulator 139. The RF modulator 139 responds to the mono audio signal, the NTSC video signal and an RF signal from a local RF oscillator 141, to produce a selected standard RF television signal on an available TV channel, typically channel 3 or channel 4.

The type of connection of the DET 102 to the television set depends on the capabilities of the user's television set. If the user has a monitor type television capable of receiving baseband video and stereo audio inputs, the appropriate terminals of the television would connect directly to the video and audio output terminals of the DET 102. If the subscriber does not have such a television monitor, then the RF output of the modulator 139 would be connected to the cable or antenna input connection of the television, e.g. by coaxial cable. Alternatively, the digitized video and audio may go to separate output terminals (not shown) for connection to inputs of digital display devices, for example, for high definition television (HDTV) sets.

Each DET 102 also includes means to receive selection signals from a user and transmit appropriate data signals over the narrowband channel, at least to the controller 19 in the shared processing system and possibly through the modem 25 and a signaling channel through the particular broadband network 5. For example, the DET 102 may send and receive control data through a signaling channel on the subscriber's loop or drop cable connecting the shared receiving system 10 to the network 5. In one embodiment, a switching element of the network routes selected broadcast channels to the shared receiving system for relay to the individual set-tops 100. The DET 102 provides selection signals to the TIM 101 for upstream transmission over the signaling channel to the controller 19 and from there through the modem 25 and the signaling channel on the drop cable to that switching element to identify a requested channel. In a similar fashion, the set-top terminal 100 may transmit upstream signaling information through the signaling channels for transport through the network 5 to a video information provider offering interactive services, e.g. video selections for a video on demand service.

In the embodiment illustrated in FIG. 4, the DET 102 includes an infrared (IR) receiver 145. The (IR) receiver 145 responds to inputs signals from a user operated IR remote control device 85 (FIG. 1) similar to that used today for controlling televisions and video cassette recorders. In response to the IR signals, the receiver 145 produces corresponding digital data output signals. The microprocessor 110 interprets the digital data signals by the IR receiver 145 as input commands. The precise interpretation of specific command signals can vary based on downloaded applications programming and/or the operating system software currently stored in the system memory 120. For example, in response to certain input commands, the microprocessor 110 controls cursor position and alphanumeric information displayed as graphics and text on the associated television set. The microprocessor 110 will also respond to an appropriate input command from the user to formulate a message for upstream transmission though the Transport Interface Module 101 and the signaling channel to the shared processing system, e.g. to select a broadcast channel.

The set-top terminal device 100 of the present invention is an open interface device in that it interacts with equipment of a large number of service providers (often referred to as "VIPs") to offer users a wide array of video and interactive multi-media services. In the preferred embodiments, the digital entertainment terminal (DET) 102 is a programmable device to which different individual video information providers (VIP's) can download applications software, and at least one VIP or the network operator (the party selling the set-top device to the end user) can download the operating system software.

The DET 102 of the present invention may also include a number of additional interface devices. In the example illustrated in FIG. 4, the DET 102 includes an IR transmitter 147. The transmitter 147 responds to digital data signals from the microprocessor 110 and outputs corresponding IR signals for wireless transmission. The IR transmitter 147 and IR receiver 145 may operate together to provide a two-way wireless data communication link to some remote device, such as a personal data assistant (PDA) or pocket organizer. Alternatively, the IR transmitter may send signals to a remote display device for use in a service not requiring the TV set. For example, in an audio on demand service, the IR transmitter would send display data to an LCD display located near the user's stereo system.

The illustrated DET also includes an RS-232 transceiver or interface 151 connected to the microprocessor 110. An RS-232 port is a standardized two-way serial data interface typically used for connecting computers to peripheral devices, such as modems. In the present system, the RS-232 interface 151 might provide a serial data connection to an external personal computer (PC), such that the DET permits communications between the PC and the broadband network. Alternatively, this port might connect the DET to a printer, e.g. to print coupons during home shopping/browsing services. A hand-held diagnostic terminal might also connect to this port during servicing of the DET. The communications and protocols offered by the DET through the interface 151 would be controlled by the operating system and applications program software downloaded into the system memory 120.

FIG. 4 also shows the DET 102 including a magnetic card reader 153 connected to the microprocessor 110. This reader 153 could be used to scan credit card information encoded on magnetic strips on commonly available credit cards. In a home shopping and purchasing service, controlled by the downloaded software, the user would scan their own credit card through the magnetic card reader 153 as part of the payment operations. The reader could also have magnetic write capabilities to perform debit card operations.

The illustrated DET 102 further includes a personal computer memory-card interface adapter (PCMCIA) port 155. This is a two-way interface for connection to and communication with a flash memory module, such as is now incorporated into advanced "smart card" devices. In a medical service, a user might communicate with a medical information database through the DET 102 and the broadband network. The user's personal medical history information could be read from the smart card and subsequently updated on the smart card, through the PCMCIA port 155. Another use of this port might involve communication to a connected video game system to download video game software to the video game system and/or play interactive video games. Although specified as a "memory" port and mapped by the CPU as part of its system memory space, the devices connected to this port 155 can have other data processing capabilities, e.g. buffering and modem communication capability. A technician may also use a PCMCIA card to load operating system software into the NVRAM 121, e.g. when there is a fatal flaw in the currently stored software.

In the current implementation, the PCMCIA port 155 will carry 6 Mbits/s of data, but the port can be designed for higher speeds such as 20 Mbytes/s. Another use of this port would be for connection to an Ethernet card or other Local Area Network (LAN) card to permit data communications between the DET 102 and one or more computers. The set-top 100 would provide the computers with communications services through the broadband network, for example to receive high speed downloads of new or updated software for those computers. Although similar functions are possible through the RS-232 transceiver 151, the data rate through the PCMCIA port 155 is much higher.

Figure 5:
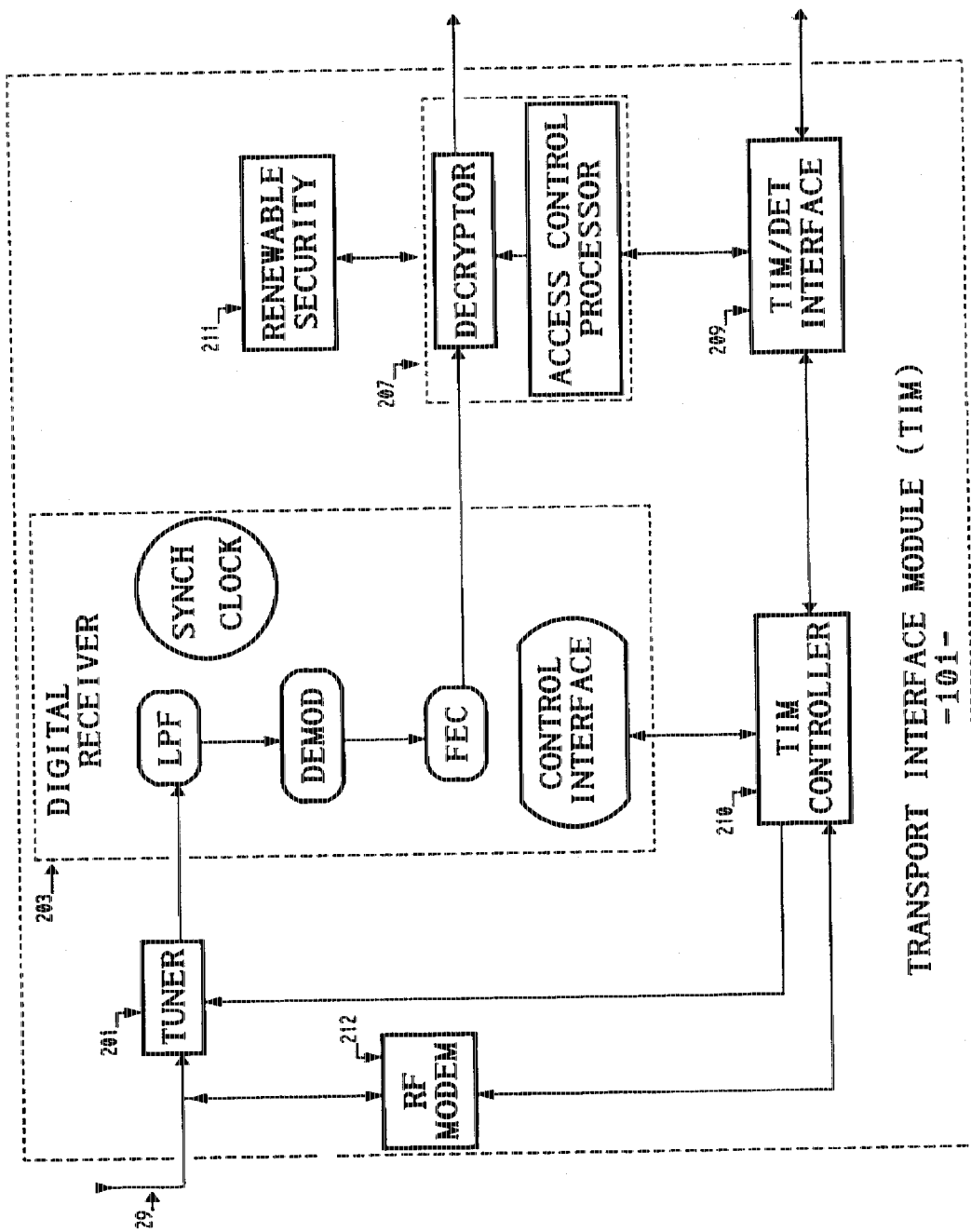
FIG. 5 is a block diagram of the Transport Interface Module (TIM) used in the set-top terminal device of FIG. 3.

FIG. 5 is a block diagram depicting the functional elements of the Transport Interface Module (TIM) 101 used in the set-top terminal device of FIG. 4. The structure illustrated is based in part on the current preference for the 64 QAM modulation techniques for the digital video signals in wireless on-premises transmission system of the type shown in FIG. 1 and as discussed in more detail below. The input to the TIM is a broadband RF signal from antenna 29. The tuner 201 selects a specific channel from the broadband input spectrum and presents it at an intermediate frequency to the digital communications receiver section 203. In accord with the present invention, the tuner 210 in each of the set-top terminals 100 serviced by a particular shared processing system 10 selects the same channel, i.e. the one channel transmitted by the system 10 from the antenna 27.

The channel selected by the tuner 210 may be a 6 MHz RF channel available for use by the customer premises system. Preferably, the wireless system utilizes spread spectrum transmission, e.g. frequency hopping. The 'channel' therefore is defined by the spread spectrum or 'chip' code used for the on-premises system. In a frequency hopping type system, for example, the code defines the sequence of hopping between frequencies. The modulator 17 hops among the frequencies in accord with the code, and tuners 210 in the set-tops 100 served by the one system 10 synchronously hop among the channels using the same code. A system in another premises would utilize the same frequencies, but the hopping code would be different.

The tuner 210 supplies the intermediate frequency channel signal to a digital receiver 203. The digital receiver 203 includes a low-pass filter, a demodulator (e.g. 64 QAM), and forward error correction circuitry. The digital receiver may also include a time domain adaptive digital equalizer (not shown). A clock circuit provides synchronization for the digital output of the demodulator, the adaptive digital equalizer (if included), and the forward error correction circuitry.

A control interface provides appropriate control signals to the elements of the digital receiver 207 in response to instructions from the transport interface module (TIM) controller 210. The digital receiver processes signals selected by the tuner 210 to capture the digital transport stream from the channel transmitted on the premises (e.g. only 27 Mbits/s payload assuming 64 QAM). The digital processor outputs the transport stream as a corrected serial baseband digital feed.

In some embodiments, the TIM 101 may include a decryption module 207. However, this module is optional, and as discussed more fully below, it is preferred to include the decryption module in the shared processing system 10. If included in the TIM 101, the decryption module 207 controls access to digital broadcast services. The decryption module 207 comprises a decryptor and an interface to a renewable security device 211. The renewable security device 211 may be a card reader for accepting a TV Pass Card. An access control processor within the decryption module 207 controls the operation of the decryptor. As discussed more below, the TIM controller 210 may also receive decryption information as signaling messages, via the RF modem 212. When properly authorized, the decryptor in module 207 decrypts payload data within packets of a selected program in the transport stream, i.e. the program selected and transmitted to the particular terminal 100. The composite MPEG transport multiplex with appropriately decrypted components for the selected program is output from the TIM 101 to the host DET's demultiplexer 127 and decompression circuitry as shown in detail in FIG. 4. The TIM controller 210 and/or the decryption module 207 receive instructions from the CPU 105 as to channel and program selections via the TIM/DET interface 209.

The CPU 105 also sends and receives messages relating to program selections and interactive services (if available on the particular network 5) to the TIM controller 210 via the TIM/DET interface 209. The TIM 101 includes an RF modem 212, such as a Ricochet modem sold by Metricom, for wireless packet data service in the 902–928 MHz range. The modem 212 interfaces to the TIM controller 210 via a standard data interface, such as an RS232 interface. The modem 212 also connects to the antenna 29. The modem 212 sends and receives packet data messages in the relevant frequency range via the antenna 39.

For example, if the user inputs a program selection using the remote control 85, the infrared transceiver 145 supplies that input to the microprocessor 110. The microprocessor 110 recognizes the input as relating to a program selection, formulates an appropriate message and forwards that message identifying the program through the TIM/DET interface 209 to the TIM controller 210. The TIM controller 209 supplies the message through the appropriate interface to the RF modem 212. The modem 212 in turn modulates the packetized data messages using the appropriate frequency and modulation techniques. Assuming use of the Metricom type equipment, the modem utilizes a frequency hopping modulation technique in the 902–928 MHz range. The modem applies the modulated upstream signal to the antenna 29 for transmission to the shared receiving system antenna 27.

Each transmitted packet from modem 212 includes an address of the shared receiving system terminal 10. The signaling data transceiver 21 receives all wireless message transmissions in the relevant frequency range (e.g. 902–928 MHz) via the antenna 27. The transceiver 21 demodulates signals in the relevant range and captures messages addressed to the shared receiving system 10. The transceiver forwards such addressed messages to the controller 19 for processing and/or further transmission thereof via the modem 25 and the network 5. If the message relates to a program selection, the controller 19 provides appropriate instructions to the elements of the shared processing system 10, to select the channel and program, and multiplex the program into the transport stream for wireless broadcast to the terminals 100.

In the reverse direction, the controller 19 formulates a message for the particular set-top terminal 100. The message may contain downstream signaling information received via the network 5 and modem 25 or messages relating to on-premises operations, e.g. a confirmation of a channel selection or a change of PID value or program number (PN) that the set-top 100 should use in decoding a requested program. The controller supplies the message to the signal data transceiver 21. The transceiver 21 packetizes the message and modulates the packets using the assigned frequency and modulation techniques utilized on the particular wireless data network. Again assuming use of the Metricom type equipment, the transceiver 21 utilizes a frequency hopping modulation technique in the 902–928 MHz range. The transceiver 21 applies the modulated upstream signal to the antenna 27 for broadcast transmission within the subscriber premises.

The broadcast message is addressed to one particular set-top terminal 100. The RF modem 212 receives all wireless message transmissions in the relevant frequency range (e.g. 902–928 MHz) via the antenna 29. The modem 212 demodulates signals in the relevant frequency range and captures messages addressed to the particular set-top terminal 100. The modem 212 passes the messages from the addressed packets over the RS232 or other interface to the TIM controller 210. The TIM controller 210 may process the message, if appropriate, e.g. if the message relates to a decryption function. Alternatively, the TIM controller 210 passes the message through the TIM/DET interface 209 to the microprocessor 110 in the main portion of DET 102.

Messages transferred to the microprocessor 110 may relate to display information, e.g. text or graphics received via network 5 for overlay on video information displayed by the set-top 100 on the associated television 103. The messages may also relate to instructions to the DET, for example to capture and process packets having a predetermined PID in a particular manner.

Figure 6:
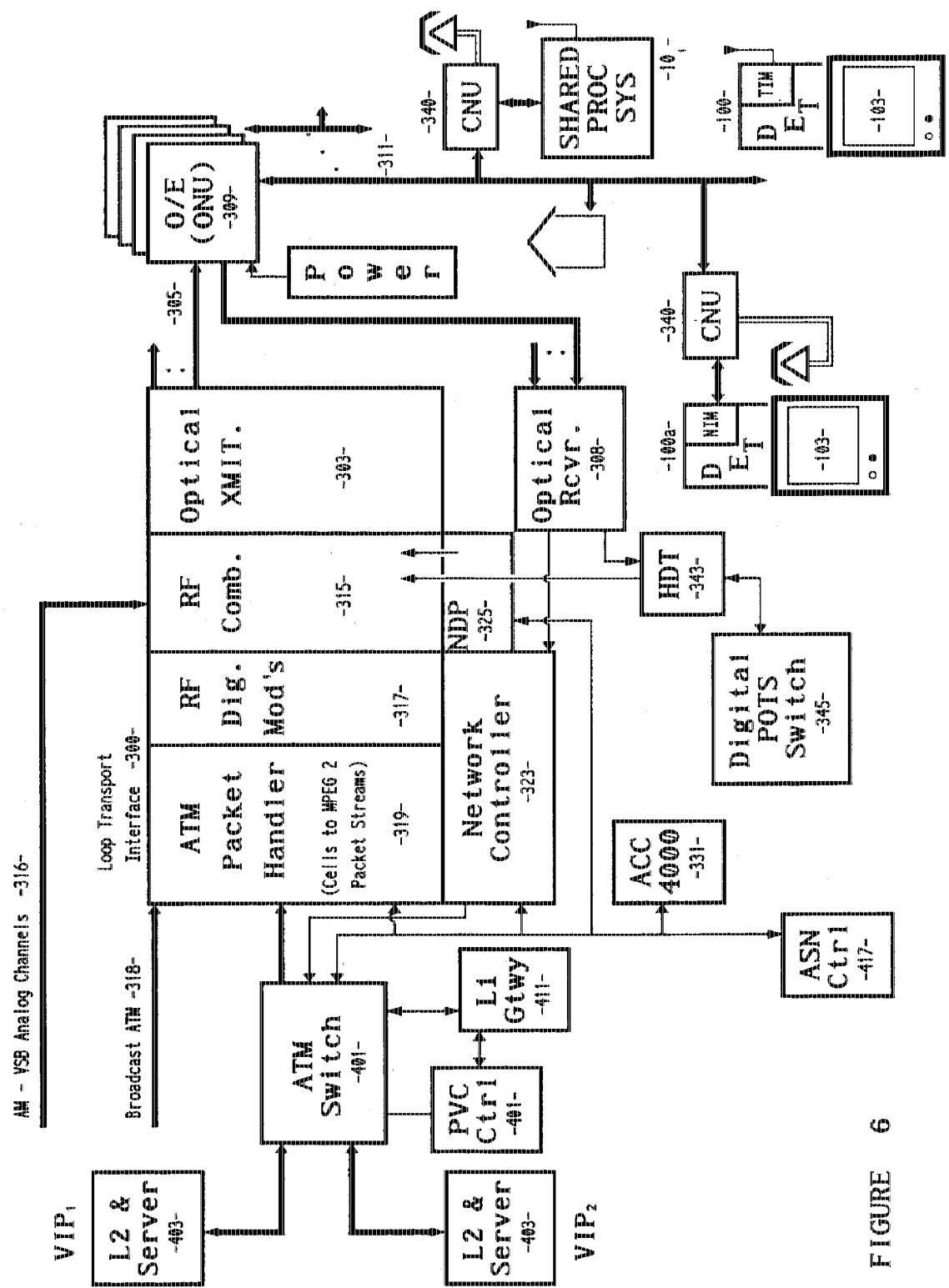
FIG. 6 depicts a simplified hybrid-fiber-coax network implementation supplying broadcast and interactive services to an on-premises distribution system in accord with the present invention.

FIG. 6 depicts a simplified hybrid-fiber-coax network implementation of the digital broadband network 5 of FIG. 1. Of particular note, the network of FIG. 6 is intended as a simplified version of the network disclosed in the above incorporated application Ser. No. 08/413,207, filed Mar. 28, 1995 entitled "ATM Packet Demultiplexer for Use in a Full Service Network Having Distributed Architecture" (attorney docket No. 680-116)

The network of FIG. 6 provides RF transport of both analog and digital broadband services. The illustrated network provides broadcast video distribution, archival video services and interactive multi-media services as well as plain old telephone service.

Within an area containing a large number of subscribers, such as a LATA, a telco deploys a number of Loop Transport Interfaces 300, only one of which appears in the drawing (FIG. 6). At least as currently envisaged, each Loop Transport Interface 300 will be located in a telco central office. In an area serviced through multiple central offices, several different central offices would each have a Loop Transport Interface similar in structure to the Interface 300 depicted in FIG. 6. In some respects, each Loop Transport Interface will serve as the headend of an otherwise conventional optical fiber trunk and coaxial cable type CATV distribution network.

In the Loop Transport Interface 300, a laser type optical transmitter 303 transmits downstream signals through fibers 305 to optical to electrical nodes referred to as "optical network units" or ONU's 309. The laser operates in a linear mode in the range of 5–750 MHz. The transmitter has an optical splitter and can transmit to several ONU nodes 309.

Each ONU 309 performs optical to electrical conversion on the downstream signals and supplies downstream RF electrical signals to a coaxial cable distribution system 311.

The optical transmitter receives and transmits signals from an RF (radio frequency) combiner 315. The combiner 315 combines and levelizes RF signals from several sources to produce the appropriate signal spectrum for driving the optical transmitter 303. One set of signals 316 supplied to the RF combiner 315 will be group of AM—VSB (amplitude modulated vestigial sideband) analog television signals from one or more appropriate sources not separately shown. Such signals are essentially "in-the-clear" CATV type broadcast signals capable of reception by any subscriber's cable ready television set. Typically, the analog stations will occupy a number of the lower video channels (e.g. channels 2 through 40) and include over-the-air programming available in the area as well as public access channels.

The analog television signals are broadcast from the optical transmitter 303 through the tree and branch optical and coax distribution network to provide "basic" CATV type service to all subscribers on the network. For subscribers choosing only analog television service who do not have a cable ready television, the network operating company offers a standard CATV type analog frequency converter (not shown), or the subscriber could choose to purchase a converter on the open market. Some set-top terminals 100a connect directly to the coaxial cable 311. In such terminals, the network interface module (NIM) includes a tuner that permits digital service subscribers to receive the analog broadcast channels through the same equipment used for the digital services.

The network depicted in FIG. 6 also provides transport for digitized and compressed audio/video programming, both for certain broadcast services and for interactive services, such as video on demand. Such programming will be encoded and compressed in MPEG II format, in precisely the manner discussed above with regard to FIG. 3.

In the illustrated Network, the MPEG encoded video is transported to each Loop Transport Interface using asynchronous transfer mode (ATM) transport and switching. ATM is a packet oriented time division multiplexing technique. In ATM, information is organized into cells having a fixed length and format. Each cell includes a header, primarily for identifying cells relating to the same virtual connection, and an information field or "payload". Specifically, a 53 octet ATM cell includes a cell header consisting of 5 octets and a payload consisting of 48 octets of data.

Transfer is asynchronous in the sense that the recurrence of cells that contain information from any particular sender is not necessarily periodic. Each device using the ATM network submits a cell for transfer when they have a cell to send, not when they have an assigned or available transmission time slot. ATM allows any arbitrary information transfer rate up to the maximum supported by the ATM network, simply by transmitting cells more often as more bandwidth is needed. In an initial implementation of the Network of FIG. 3, however, all video materials will be transferred at a constant, standardized bit rate. Preferred later generations of the network will utilize the ATM capabilities of the network to permit transmission of video information over channels of different bit rates, e.g. 1.5 Mbits/sec, 3 Mbits/sec, 6 Mbits/sec, etc. It will also be possible to vary the bit rate during communication on an as needed basis.

In ATM based networks of the type under consideration here, the MPEG II bit streams are converted into cellular payload data, and cell headers are added. As noted above, each MPEG packet consists of 188 bytes, whereas each ATM cell includes 48 bytes of payload data. An ATM multiplexer (not shown in FIG. 6) maps the MPEG packets into ATM cells. The presently preferred the ATM multiplexer uses two different adaptations to encapsulate MPEG II packets in ATM cells. The first adaptation maps one 188 byte MPEG packet together with overhead and padding into five ATM 48 byte cell payloads. The second adaptation maps two 188 byte MPEG packets into eight ATM 48 byte cells payloads. The multiplexer uses the 5 cell adaptation for first MPEG packets containing a PCR value and uses the 8 cell adaptation for pairs of packets where the first packet does not contain a PCR value. Details of these adaptations are set forth in compending application (attorney docket no. 680-123).

Each cell of a particular stream will have a header which contains a virtual path identifier/virtual circuit identifier (VPI/VCI) to identify the virtual circuit that the cells pertain to. All MPEG packets for a given program, whether video, audio or data, will be mapped into ATM cells having the same VPI/VCI. Conversely, cells having a given VPI/VCI will contain data corresponding to only one identified program. Thus, for a broadcast program, the cells from the one broadcast source all contain the same VPI/VCI value whether the five-cell adaptation was used or the eight-cell adaptation was used.

In a 5 cell adaptation, the header of all five of the ATM cells will contain the VPI/VCI value assigned to the particular communication. Similarly, in an 8 cell adaptation, the header of all eight of the ATM cells will contain the VPI/VCI value assigned to the particular communication. The header of the first of the cells also has a bit designated "AAU" which has a value of "0" to identify that cell as the first cell. The header of the fifth cell or the eighth cell will have an AAU bit value of "1" to identify that cell as the last cell.

At the network node which terminates the ATM cell transport, e.g. the ATM packet handler 319 in FIG. 6, a receiver captures each ATM cell having a specified VPI/VCI. As part of the reverse adaptation functionality, an ATM demultiplexer (handler 319 in FIG. 6) buffers cells until it finds a cell having an AAU value of "0" in its header (first cell) and another cell having an AAU value of "1" in its header (last cell). The demultiplexer counts the number of cells from first to last to determine the type of adaptation used to map cells.

If the demultiplexer has captured five cells, the original MPEG packet is reconstructed from the appropriate bytes of payload data from the first four cells. Similarly, if the receiver has captured eight cells, the original pair of MPEG packets is reconstructed from the appropriate bytes of payload data from the eight cells.

In the illustrated network, digital broadcast service signals 318 in MPEG encoded form and arranged in ATM cell packets are applied to one or more input ports of an ATM packet handler 319 in the Loop Transport Interface 300. These broadcast service signals originate in one or more broadcast VIP's ATM servers which essentially comprise a plurality of MPEG encoders and an ATM multiplexer. MPEG II broadband signals are mapped into ATM cells, and a number of ATM cell streams are multiplexed together at an OC rate.

The ATM broadcast services 318 will carry premium service type programming. The ATM broadcast signals may originate from any appropriate source (not shown). Fully interactive broadband digital signals, in MPEG—ATM format, are also applied to the ATM packet handler from an ATM switch 401. The ATM packet handler 319 terminates all ATM cell transport through the Network.

The ATM packet handler 319 receives the ATM cell streams and converts the cell payload information into MPEG II packet streams. As such, the ATM packet handler 319 comprises an ATM demultiplexer for demultiplexing ATM virtual circuits and performing the reverse adaptation to recover the MPEG packet streams for various programs. The packet handler 319 also includes an MPEG II multiplexer for multiplexing a number of MPEG II packetized programs into each of a plurality of super transport streams. The format of these transport streams is identical to that discussed above relative to FIGS. 3A and 3B except that the program numbers (PNs) and PID values are assigned to the individual programs transported through the network.

In addition to the analog broadcast signals, the RF combiner 315 which prepares signals for downstream transmission by the optical transmitter 303 receives a variety of other analog RF signals from a group of RF digital modulators 317. The RF analog outputs from the modulators 317, however, carry digital broadband information. The super transport stream content for each of the digital RF modulators 317 comes from the ATM packet handler 319, the operation of which is controlled by the Access Subnetwork Controller 417.

U.S. Pat. No. 5,231,494 to Wachob, the disclosure of which is incorporated herein in its entirety by reference, teaches quadrature phase shift keyed (QPSK) modulation of a plurality of video, audio and data signals into a single data stream within a standard 6 MHz channel allocation for transmission over a CATV type distribution network. The currently preferred implementation of the network of FIG. 6 uses 64 QAM (quadrature amplitude modulation) or 16 VSB (vestigial sideband) modulation techniques in the RF modulators 317 in the Loop Transport Interface 300. For example, using 64 QAM, 4 channels of 6 Mbits/s MPEG encoded digital video information can be modulated into one 6 MHz bandwidth analog channel. Similarly, 16 VSB yields 6 channels of 6 Mbits/s MPEG encoded digital video information modulated into one 6 MHz bandwidth analog channel. Each RF modulator produces a 6 MHz bandwidth output at a different carrier frequency.

The preferred 64 QAM modulators actually modulate up to 30 Mbits/s (27 Mbits/s payload plus 3 Mbits/s of forward error correction) into one 6 MHz bandwidth signal. The MPEG multiplexing components of the packet handler 319 outputs one 30 Mbits/s MPEG II super transport stream to each of the QAM type modulators 317. For simplicity assume four 6 Mbits/s programs within the 27 Mbits/s payload of the stream, but it should be understood that the 27 Mbits/s payload may contain some mix of 6 Mbits/s, 3 Mbits/s and/or 1.5 Mbits/s programs fully utilizing the 27 Mbits/s payload capacity.

The QAM modulators 317 modulate the super transport streams into a 6 MHz wide intermediate frequency channel. Up-converters (not separately shown) convert the intermediate frequency signals from the modulators to allocated CATV RF channels in the 50–750 MHz range.

The 6 MHz bandwidth RF signals from the modulators 317 are combined and supplied to the optical transmitter 303 for downstream transmission together in a combined spectrum with the AM—VSB analog television signals 316. The downstream transport of the digital programming is an RF transmission exactly the same as for the analog basic service channels, but each of the channels from the RF modulators 317 contains 4 or more digitized and compressed video programs in one multiplexed bit stream. The 6 Mhz digital transport channels will be carried through the fiber and coaxial system in standard CATV channels not used by the analog basic service programming. The ONU 309 is essentially transparent to both the analog basic service channels and the channels carrying the digital programming and supplies all of the signals as a combined broadcast over the coaxial cable network 311. The optical fiber 305 from the transmitter, the ONU's 309 and the coaxial distribution systems 311 therefor provide a broadcast network transporting all downstream programming to all subscriber premises serviced thereby.

The network of FIG. 6 services a large number of customer premises. Some customers will have in-home wireless distribution systems, comprising a shared processing system $10_1$ and a plurality of terminals 100 and television sets 103, in accord with the present invention. Other customers will have set-top terminal devices 100a which connect to the cable network 311. Such wire connected terminals 100a will include a DET identical to the DET 102 shown in FIG. 4. The terminals 100a will also include a network interface module (NIM). The NIM provides the actual physical connection to the coaxial cable 311 and the two-way signal and protocol conversion between the signals on the cable network 311 and those used by the DET, both for downstream broadband reception and for two-way signaling communication via out-of-band signaling channels.

In this network, the NIM is similar in structure to the TIM 102 shown in FIG. 5. The tuner in the NIM is a CATV frequency type RF tuner for selecting 6 MHz wide channels from the 50–750 MHz frequency range. One difference from the TIM, is that the NIM will have an RF bypass and an associated demodulator for processing the analog RF channels. The NIMs each include a decryption module similar to the module 207 shown in FIG. 5. Also, the RF modem in the NIM is a frequency agile QPSK modem.

Figure 7:
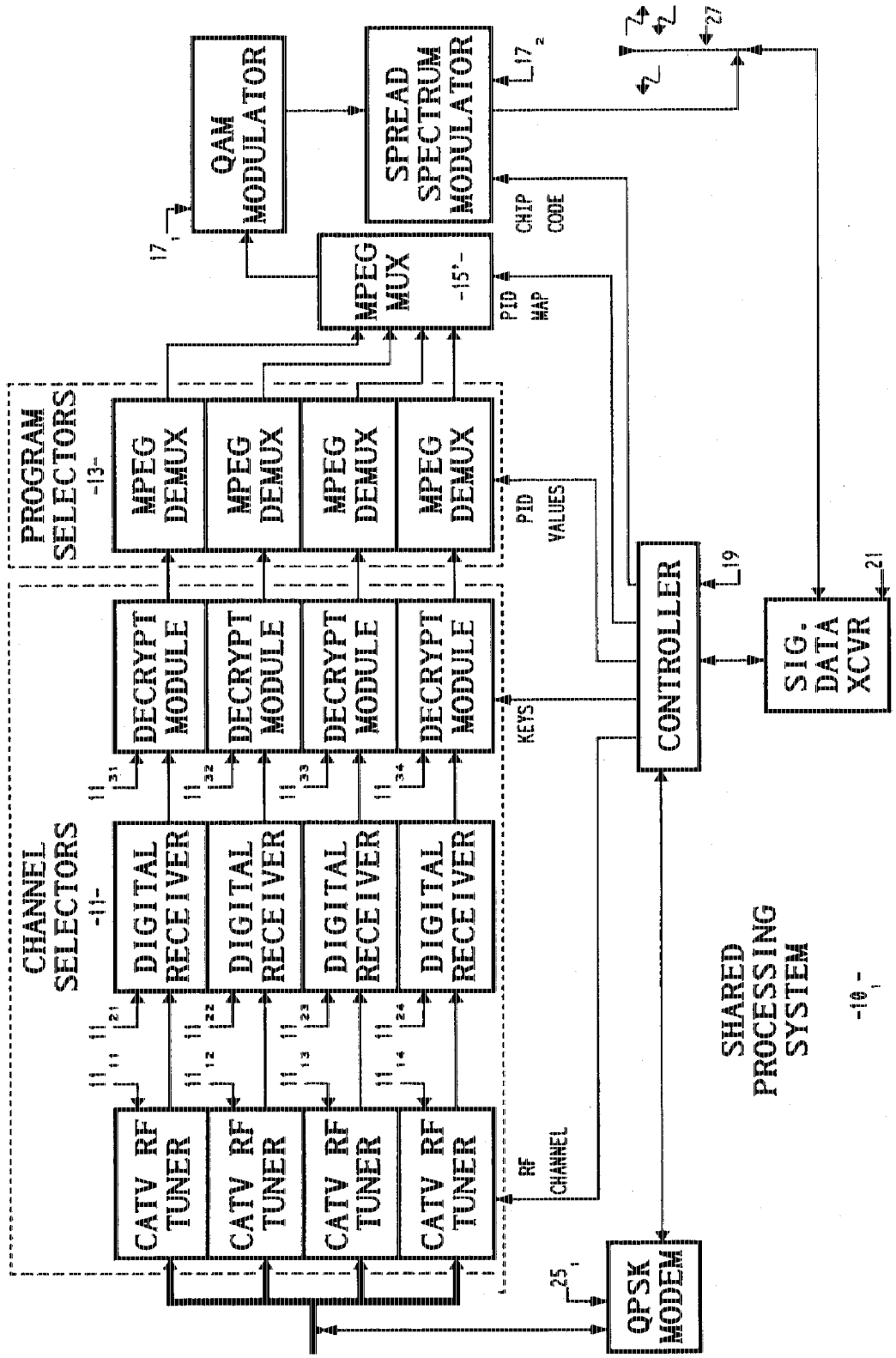
FIG. 7 is a functional diagram of a shared processing system in accord with the present invention for use with the network of FIG. 6.

To facilitate understanding of the network of FIG. 6, the following discussion concentrates principally on a customer premises installation utilizing a physical connection of the NIM in the terminal 100a to the cable 311. After the discussion of the network in that context, a discussion of a specific implementation of the shared processing system $10_1$ with respect to FIG. 7 illustrates a wireless distribution type customer premises installation and operation thereof in accord with the present invention.

At the subscriber premises not using wireless on-premises distribution, the network interface module (NIM) couples the set-top device or digital entertainment terminal (DET) 100a to a drop cable of the coaxial distribution network 311. In this Network configuration, the NIM includes an analog frequency tuner controlled by the microprocessor in the main portion of the DET 100a to selectively receive the RF channel signals, including those channels carrying digital information. The also includes a QPSK, QAM or VSB demodulator to demodulate the digitized program signals carried in one of the received 6 MHz channel and will perform a forward error correction function on the demodulated data. The digital audio/video signal processor within the main portion of the DET selects packets of one of the programs from the digital data, decompresses received audio and video signals, generates graphics display information and performs digital to analog conversion to produce output signals compatible with a conventional television set 100', exactly as in the earlier embodiment.

The analog tuner in the NIM will tune in all channel frequencies carried by the network, including those used for the analog broadcast services. The NIM in terminal 100a includes a bypass switch or the like and an analog demodulator to selectively supply analog signals from the basic service channels directly to the audio/video output terminals or to the modulator, to provide signals to drive a standard television receiver. The DET 100a therefore can be used as a frequency converter for reception of the analog signals.

Each wire connected set-top terminal 100a includes a remote control and/or keypad to receive various selection signals from a user. At least in response to certain user inputs, such as selection of a pay per view event, the DET in terminal 100a relays data signals upstream over a signaling channel on the coaxial cable to the ONU 309. The actual transmission of any such data signals upstream from the terminal 100a occurs in response to a polling of the DET by the ONU 309. The ONU 309 combines upstream data signals from the DET's serviced thereby and transmits those signals upstream over another optical fiber 307 to an optical receiver 308 in the Loop Transport Interface 300. Each set-top terminal 100a may transmit data on a different carrier frequency, in which case the network controller 323 knows which DET sent particular data based on the received frequency channel. Alternatively, for interactive services, the terminal 100a may transmit a unique identification code with the upstream message.

The optical receiver 308 supplies the upstream signaling channels to a network controller 323. The network controller 323 includes appropriate RF demodulators and data processing equipment to process all upstream signaling from the terminals 100a and shared processing systems 101, serviced by the loop transport interface 300. The network controller 323 communicates upstream data messages from the NIMs to the ACC 4000 331 via an Ethernet connection. The Ethernet also provides a connection through an ATM router (not shown) to the ATM switch 410 to transport upstream signaling information received by the network controller 323 to the level 1 gateway 411 and/or various VIPs' equipment 403.

A network data processor 325 controls all downstream out-of-band signaling transmissions. The network data processor 325 receives messages for transmission via the Ethernet. The network data processor 325 includes a CPU to process the messages, typically addressed in accord with Internet protocol addressing. The network data processor 325 includes at least one QPSK modulator for modulating downstream out of band signaling messages onto an RF channel not otherwise used for program transport.

The Access Subnetwork Controller 417 controls all services provided through the loop transport interface 300. The Access Subnetwork Controller 417 communicates with the elements of the loop transport interface 300, e.g. the ACC 4000 331, the network controller 323, the NDP 325 and the ATM packet handler 319 via the Ethernet. For example, the Access Subnetwork Controller 417 provides instructions to the ATM packet handler 319 to use the VPI/VCI header from the ATM cells to route the reconstructed MPEG packet streams to the appropriate ones of the digital RF modulators 317.

Certain digital program signals carried on the network may be encrypted using encryption technology and key codes. Details of specific encryption algorithms, the key codes are well known to those skilled in the art and familiar with the relevant patents and literature.

In the implementation of the network illustrated in FIG. 6, an ACC 4000 331 performs set top management, encryption control and specific program access control functions. The ACC 4000 responds to instructions from the Access Subnetwork Controller 417 to administer encryption and terminal device operations and control. For example, the ACC 4000 transmits instructions (e.g. including decryption keys) through the network data processor 325 and the downstream out of band signaling channel to the NIMs and the controllers in the shared processing systems $10_1$ to control access to individual channels.

Service profiles for each customer on the network and their set-top terminals (both wire-connected terminals and set-top terminals serviced via wireless on-premises distribution) are set up and stored within the level 1 gateway 411. The level 1 gateway 411 may also provide an interface to appropriate billing systems (not shown) for some broadcast services, such as pay per view. For ATM broadcast services, when a subscriber first signs up, a portfolio of channels subscribed to by that customer is established in the subscriber's profile data within the level 1 gateway and downloaded to the Access Subnetwork Controller 417 through the ATM switch and the Ethernet. Based on this profile data, the Access Subnetwork Controller instructs the ACC 4000 to download decryption keys to decrypting circuitry included in the NIM of the subscriber's terminal 100a or to the controller 19 or TIM 101 in a wireless on-premises distribution installation. If a service key is needed to permit a terminal to receive broadcast channels, the Access Subnetwork Controller 417 returns that service key to the level 1 gateway 411 for transmission to the DET portion of the terminal 100a or to the controller 19 of the shared processing system $10_1$. In the preferred embodiment, the service key is identified as a 'connection block descriptor' and includes information defining a logical network channel number used to access the broadcast channel, and RF channel information needed to tune to the RF channel carrying the program. For digital services, the connection block descriptor also includes either a program number or at least one MPEG II PID value (e.g. the PID for the PMT) needed to identify the program within the digital stream on that RF channel.

All digital broadcast service signals are broadcast into each subscriber's premises, and each terminal 100a includes means for receiving and decoding each such digital broadcast service channel. As discussed later with regard to FIG. 7, each shared processing system $10_1$ and the associated terminals 100 can receive and decode each digital broadcast service channel. The microprocessor in the DET of terminal 100a or the controller 19 in shared processing system $10_1$ controls access to any of these channels based on the downloaded connection block descriptor information stored in the system memory (and/or downloaded decryption keys). For example, if one subscriber requests HBO, and that subscriber has paid to subscribe to HBO, the subscriber's terminal 100a or the controller 19 will contain map information based on connection block descriptors to tune the RF channel and select and decode the digital program carrying HBO for display on the subscriber's television set 103. If encrypted, data stored in the NIM or in the controller 19 will permit decrypting of the selected program channel. However, if a requesting subscriber has not paid for HBO, the downloaded information will not provide the requisite data for tuning and decoding of that channel and the NIM will not store the relevant decryption key.

The illustrated network also offers pay per view services through the ATM broadcast program channels 318. A user selects a pay per view event by operating the terminal 100a. The terminal 100a transmits a purchase message upstream through the Loop Transport Interface 300 to the level 1 gateway 411. If the authorization data in the subscriber's profile in the level 1 gateway 411 indicates that the terminal identification is valid and the subscriber is authorized to purchase such events, the level 1 gateway instructs the Access Subnetwork Controller 417 to authorize reception. If decryption is required, the Access Subnetwork Controller instructs the ACC 4000 331 to provide a decryption key to the NIM. In response to an appropriate message from the level 1 gateway 411, the terminal 100a decodes the pay per view event in essentially the same manner as for other premium services carried on the ATM broadcast channels 318, as outlined above. Similar procedures are used to authorize reception of pay per view events by a set-top terminal 100 serviced through shared receiving system $10_1$.

The implementation of the network illustrated in FIG. 6 also provides telephone service. Between the optical network unit and the subscriber premises, the 700–750 MHz portion of the spectrum on the coaxial cable will carry the telephone signals. This allocated spectrum provides transport for 24 DS0 telephone channels. Each subscriber premises will have telephone interface referred to as a Cable Network Unit (CNU) 340 coupled to the coaxial cable which serves to couple two-way signals between a twisted wire pair into the home and the telephone frequency channels on the coaxial cable 311.

Carrier frequencies used for telephone services may be individually assigned to particular subscriber's CNU's. Also, the telephone signal spectrum is carried on the same two fibers that carry the video and the upstream signalling between the Loop Transport Interface and the ONU. Upstream telephone signals are applied from the optical receiver 308 to a host digital terminal (HDT) 343 which provides an interface to a standard digital telephone switch 345. Downstream telephone signals from that switch pass through the HDT 343 to the RF combiner 315 for transmission in the 700–750 MHz frequency range over the fiber to the ONU 309 and the coaxial cable distribution system 311.

In an alternate implementation not shown, the Loop Transport Interface 300 would dynamically allocate the DS0 channels on the coaxial cable system 311 on a time-sharing basis, in essentially the same manner as in mobile radio systems. Two additional fibers and a second optical transmitter and receiver pair would carry the two-way telephone signals to and from the ONU 309. Because of the use of the separate optical links for telephone service in this alternate implementation the HDT and telephone switch need not be closely associated or collocated with any particular one of the Loop Transport Interfaces.

Battery power for telephone service and for the various interfaces will be applied through the ONU's 309 and supplied downstream over the coaxial cable.

The implementation of the network illustrated in FIG. 6 offers access to video information providers (VIP's) for interactive broadband services, such as video on demand. For archival services and many other interactive services, each VIP has a level 2 gateway and some form of broadband information file server 403. The ATM switch 401 provides communications links between the Loop Transport Interfaces 300 and the level 2 gateways and file servers 403. Customer access to the IMTV VIP's is controlled through one or possibly more programmed computer or processor elements performing the processing functions of the level 1 gateway 411. A permanent virtual circuit (PVC) controller 415 and the Access Subnetwork Controller 417 respond to signals from the level 1 gateway 411 to control the point to point routing through the network. The PVC controller 415 stores data tables defining all possible virtual circuits through the ATM switch 401. These data tables define the header information and the switch port to the packet handlers needed to route cells to the correct Loop Transport Interface 300. The Access Subnetwork Controller 417 stores similar data tables identifying the transmission fiber ports, RF channels and multiplexed digital channel bandwidth which may be used to transport each data stream processed by the ATM packet handler 319 through the fiber 305 to the appropriate ONU 309 serving each DET.

For a full, broadband interactive session, the subscriber operates the terminal 100 or 100a to interact with the level 1 gateway 411 and select a VIP, and the level 1 gateway interacts with the VIP's level 2 gateway to determine if the VIP will accept the call. The VIP's acceptance message includes a server port identifier and an originating VPI/VCI value for the downstream transmission. Typically, the VIP will also specify the bandwidth.

The level 1 gateway 411 sends a request to the Access Subnetwork Controller 417 requesting a connection to the subscriber's terminal 100 or 100a of the specified bandwidth. Based on its stored data tables as to resources which are currently available, the Access Subnetwork Controller 417 identifies available bandwidth on one of the RF channels and a port through the ATM packet handler 319 for data going to the modulator 317 corresponding to the particular channel. The Access Subnetwork Controller 417 internally reserves the bandwidth capacity on the particular channel and an available terminating VPI/VCI value. The Access Subnetwork Controller 417 transmits a reply message back to the level 1 gateway 411 containing the port identifier and the VPI/VCI value.

The PVC controller 415 responds to instructions from the level 1 gateway 411 by activating the ATM switch 401 to establish a downstream virtual circuit path between the assigned port of the VIP's server and the ATM packet handler 319 within the Loop Transport Interface 300. The Access Subnetwork Controller 417 controls the ATM packet handler 319 to route MPEG data recovered from the ATM cells for the particular point to point communication to the port for one of the RF modulators 317 so that the modulator will include the MPEG data in the assigned digital channel within a particular 6 MHz RF channel. The Access Subnetwork Controller 417 may also instruct the packet handler 319 what PID values and program number (PN) to use in the packet stream.

The Access Subnetwork Controller 417 also supplies the level 1 gateway 411 with the connection block descriptor for the assigned bandwidth, and that gateway relays the descriptor through the signaling channel to the subscriber's terminal 100a or to the controller 19 in the shared processing system $10_1$. The terminal 100a uses the RF channel information to tune to the particular RF channel and uses the PID value to capture and decode MPEG data from the specifically assigned digital channel within that RF channel. The shared processing system $10_1$ utilizes this information to control the channel and program selectors to select the IMTV broadband program for multiplexing and wireless transport to one of the terminals 100.

Concurrently, the level 1 gateway 411 would instruct the PVC controller 415 to control the ATM switch 401 and the Access Subnetwork Controller 417 to control the network controller 323 to establish an upstream connection for control signals sent from the terminal 100a or the shared processing system $10_1$ up through the fiber-coax network and receiver 308 to the VIP's level 2 gateway. The combination of upstream and downstream, point to point channels are used for control functions for interactive service communications, e.g. to order 'on-demand' transmissions of selected videos.

FIG. 7 is a functional diagram of a shared processing system $10_1$ for use with the hybrid-fiber-coax network of FIG. 6. It is still assumed that the digitization and compression both on the network and in the shared processing system $10_1$ utilizes 6 Mbits/s MPEG encoding and the digital modulation on the network and in the shared processing system utilizes 64 QAM. The shared processing system $10_1$ therefore will support up to four set-top terminals 100 (FIG. 6).

In this embodiment, the channel selectors 11 comprise four CATV RF tuners $11_{11}$ to $11_{14}$, one for each of the set-top terminals 100 serviced by the shared processing system $10_1$. The bank of channel selectors 11 also include four digital receivers $11_{21}$ to $11_{24}$, and four decryption modules $11_{31}$ to $11_{34}$. Each CATV tuner is a controlled channel selector for selecting one of the 6 MHz wide RF channels carried on the hybrid fiber coax network of FIG. 6. The digital receivers $11_{21}$ to $11_{24}$ are essentially identical to the digital receiver 203 included in the TIM 101 of FIG. 5. Each of the decryption modules $11_{31}$ to $11_{34}$ corresponds to the decryption module 207 discussed above with regard to FIG. 5.

For each set-top terminal 100, one CATV RF tuner $11_1$ selects a specific RF channel from the broadband input spectrum in response to an instruction from the controller 19 and presents the selected channel at an intermediate frequency to the corresponding digital communications receiver section $11_2$. The digital receiver $11_2$ includes a low-pass filter, a demodulator (e.g. 64 QAM), and forward error correction circuitry. The digital receiver may also include a time domain adaptive digital equalizer. A clock circuit provides synchronization for the digital output of the demodulator, the adaptive digital equalizer (if included), and the forward error correction circuitry.

A control interface provides appropriate control signals to the elements of the digital receiver in response to instructions from the controller 19. Each digital receiver $11_2$ processes signals selected by the corresponding tuner $11_1$ to capture the digital transport stream from the selected RF channel broadcast through the hybrid-fiber-coax network of FIG. 6 (e.g. only 27 Mbits/s payload assuming 64 QAM). The digital processor outputs the transport stream as a corrected serial baseband digital feed.

In the preferred embodiments, one of the decryption modules $11_{31}$ to $11_{34}$ controls access to digital broadcast services selected by one of the four set-top terminals 100. The decryption module comprises a decryptor and possibly an interface to a renewable security device. An access control processor within the decryption module $11_{31}$ controls the operation of the decryptor. The controller 19 also receives decryption information as signaling messages, via the QPSK modem $25_1$. When properly authorized, the decryptor in each module $11_3$ decrypts payload data within packets of a selected program in the transport stream.

A composite MPEG transport multiplex with appropriately decrypted components for the selected program is output from each of the decryption modules $11_{31}$ to $11_{34}$ to the corresponding one of the program selectors 13. In this embodiment, each one of the program selectors 13 comprises an MPEG demultiplexer. Each of the MPEG demultiplexers is essentially similar in structure and operation to the MPEG system demux 127 included in the DET 102. Although only one connection line is shown for simplicity, each MPEG demux type program selector 13 outputs a digital base band video signal, one or more digital baseband audio signals and possibly one or more digital data signals.

The four MPEG demultiplexers supply selected program signals to an MPEG multiplexer 15'. The MPEG multiplexer 15' combines the packets for the video, audio, etc. for the four programs together with the program association table and program mapping packets in the manner discussed above with regard to FIGS. 2, 3A and 3B. Specifically, the controller 19 supplies PID value mapping instructions to the MPEG multiplier 15' to control PID value processing by that multiplexer. In the exemplary embodiment shown in FIG. 7, these instructions specify the PID values to be inserted in the packets containing the audio, video and data for each of the selected programs. The PID values may correspond to PID values utilized on the network of FIG. 6. Alternatively, the PID values may be assigned to the individual set-top terminals, in a manner discussed above with regard to FIGS. 3A and 3B.

The MPEG multiplexer 15' adds forward error correction information to the resultant MPEG II super transport stream and supplies the stream to a QAM modulator $17_1$. The modulator $17_1$ is similar in structure and operation to the 64 QAM modulators utilized as the RF modulators 317 in the preferred implementation of the network of FIG. 6. The 64 QAM modulator $17_1$ supplies an intermediate frequency signal to a spread spectrum modulator $17_2$. The preferred embodiment of the modulator $17_2$ utilizes a frequency hopping type spectrum spreading modulation. A unique chip code from the controller 19 determines the precise frequency hopping sequence. The spread spectrum modulator $17_2$ supplies modulated RF signals to the antenna 27 for wireless broadcast to the set-top terminals 100, as discussed above.

To the network of FIG. 6, the operation of the terminals 100 in the wireless premises distribution system appears identical to that of a wire connected terminal 100a, discussed briefly above. The shared processing system $10_1$ provides a channel selection directly analogous to that performed in the NIMs of four of the wire connected terminals 100a, and that system relays a multiplexed broadcast of selected program signals to the actual set-top terminals 100. The shared processing system $10_1$ also provides two-way out of band signaling through the network using the QPSK modem $25_1$ and provides two-way wireless signaling to the set-tops 100 utilizing the transceiver 21.

For example, to select and program, one of the terminals 100 will supply a selection request message to the controller 19 using a wireless signaling data transmission. Again, the controller 19 stores program mapping information, in this case, based on connection block descriptors received via the network from the level 1 gateway 411 during system initialization. In response to the program selection, the controller 19 supplies RF channel information to the tuner $11_1$ and decryption key information (if appropriate and already downloaded from the ACC 4000D 331) to the decryption module $11_3$ assigned to that terminal to process the channel carrying the selected program. The tuner, receiver and decryption module select and process one channel to output the transport stream therefrom to the corresponding MPEG demultiplexer. In that output transport stream (27 Mbits/s), the payloads of at least the packets relating to the selected program are in unencrypted form.

The controller 19 also supplies control instructions to the MPEG demultiplexer 13 servicing the requesting set-top terminal 100. Specifically, the MPEG demultiplexer supplies information from the PID 0 packet, i.e. the program association table, to the controller 19. The controller 19 uses the program number (PN) from the channel map to identify the PID value for the correct program map for the selected program from the program association table. Alternatively, the controller may have received that PID value in the connection block descriptor. The controller 19 supplies that PID value to the MPEG demultiplexer assigned to the particular set-top terminal 100. When the MPEG demultiplexer receives a packet containing that PID, it supplies information from the packet identified by the PID (the program map) to the controller 19. From the program map, the controller 19 identifies the PID values for the video and audio (and data if any) for the selected program and instructs the demultiplexer 127 to supply those packets to the respective inputs of the MPEG multiplexer 15'.

The MPEG multiplexer 15' multiplexes the audio, video and data (if any) for the selected program together in one transport stream with those for programs selected by the other terminals serviced by the system $10_1$ and adds forward error correction information. The MPEG multiplexer 15' supplies the resultant data stream to the QAM modulator $17_1$, and the QAM modulator $17_1$ supplies the resultant 6 MHz wide intermediate frequency signal to the spread spectrum modulator $17_2$ for broadcast via antenna 27.

The controller 19 may also supply a program number (PN) or the PID value of the PMT for a selected program to the set-top terminal 100 from which a program selection originated. Alternatively, the PID mapping results in unique assignments of PID values to each of the terminals 100, and the terminals each store corresponding PID value information to facilitate capture and processing of the selected program, as discussed above relative to FIGS. 3A and 3B.

With reference to FIG. 5, the antenna 29 connected to the user's set-top terminal 100 receives the broadcast signal transmission and supplies the signal to the TIM 101. The TIM 101 demodulates the signal and supplies the transport stream (27 Mbits/s payload only) to the DET 102. The DET 102 will have stored the necessary packet identifiers in memory, either by receiving them from the controller 19 via a data signaling communication or by decoding the PID 0 packet and the PMT for the selected or assigned program. The DET 102 utilizes the packet identifiers to capture and process digitized and compressed information for the selected program from the transport stream output by the TIM 101.

Consider a specific example wherein the CPU 105 in the DET 102 (FIG. 4) has stored a program number for the program selected by the particular terminal 100. The MPEG demultiplexer 127 supplies information from the PID 0 packet, i.e. the program association table, to the CPU 105. The microprocessor 110 uses the program number (PN) from the system memory 120 to identify the PID value for the correct program map table (PMT) from the program association table. The CPU 105 supplies that PID value to the MPEG demultiplexer 127. When the MPEG demultiplexer 127 receives a packet containing that PID, it supplies information from the packet identified by the PID (the program map table) to the CPU. From the program map table (PMT), the CPU 105 identifies the PID values for the video and audio for the program and instructs the demultiplexer 127 to supply the payload information from those packets to the respective MPEG decoders 129, 131 to begin MPEG decoding of the selected program, for presentation to the user via the associated television set 103.

The controller 19 and the QPSK modem $25_1$ also facilitate two-way communication through the network of FIG. 6 for interactive services. When the user activates the remote control to signify a request for a call to a particular IMTV VIP, the controller 19 initiates communications through the network in a manner analogous to that for a communication from a wire connected terminal 100a to the VIP's equipment, as discussed above. The controller 19 will relay signaling information as appropriate to the terminal 100 using the transceiver 21. As part of the interactive call set-up procedure, the network allocates bandwidth to the session with the particular terminal. As part of that allocation, the level 1 gateway 411 informs the controller 19 of the RF channel and program number assigned to the terminal for this session. The controller 19 utilizes this information to control the channel selector 11 and the program selector 13 assigned to the terminal, to select the RF channel and select the program information from the transport stream on that channel, in precisely the same manner as for a broadcast program.

The shared processing system $10_1$ shown in FIG. 7 will work with a wireless broadcast network of the type disclosed in the above incorporated Ser. No. 08/405,558 application. In such an implementation, the selectors 11 would receive RF channel signals in the 50–450 MHz range from a microwave directional receiving antenna and a downconverter. The channel and program selection would be identical to that for broadcast programs when the system $10_1$ was connected to the network of FIG. 6. At least the initial implementations of the wireless network would not include two-way signaling channels for interactive services, and in such installations there would be no need for the signaling modem 25.

Figure 8A:
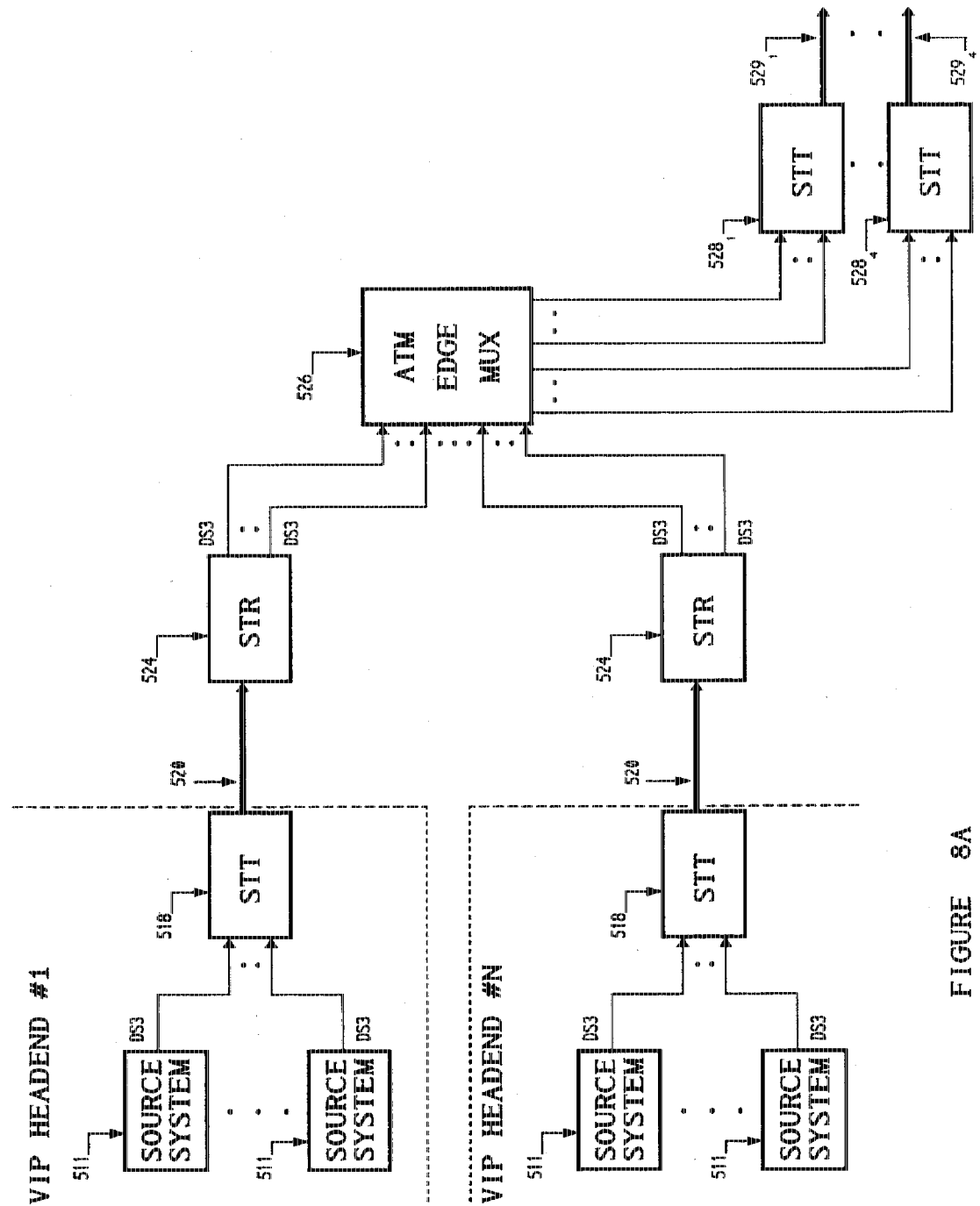
FIGS. 8A and 8B together show an example of a switched digital video type network supplying broadcast and interactive services to an on-premises distribution system in accord with the present invention.
Figure 8B:
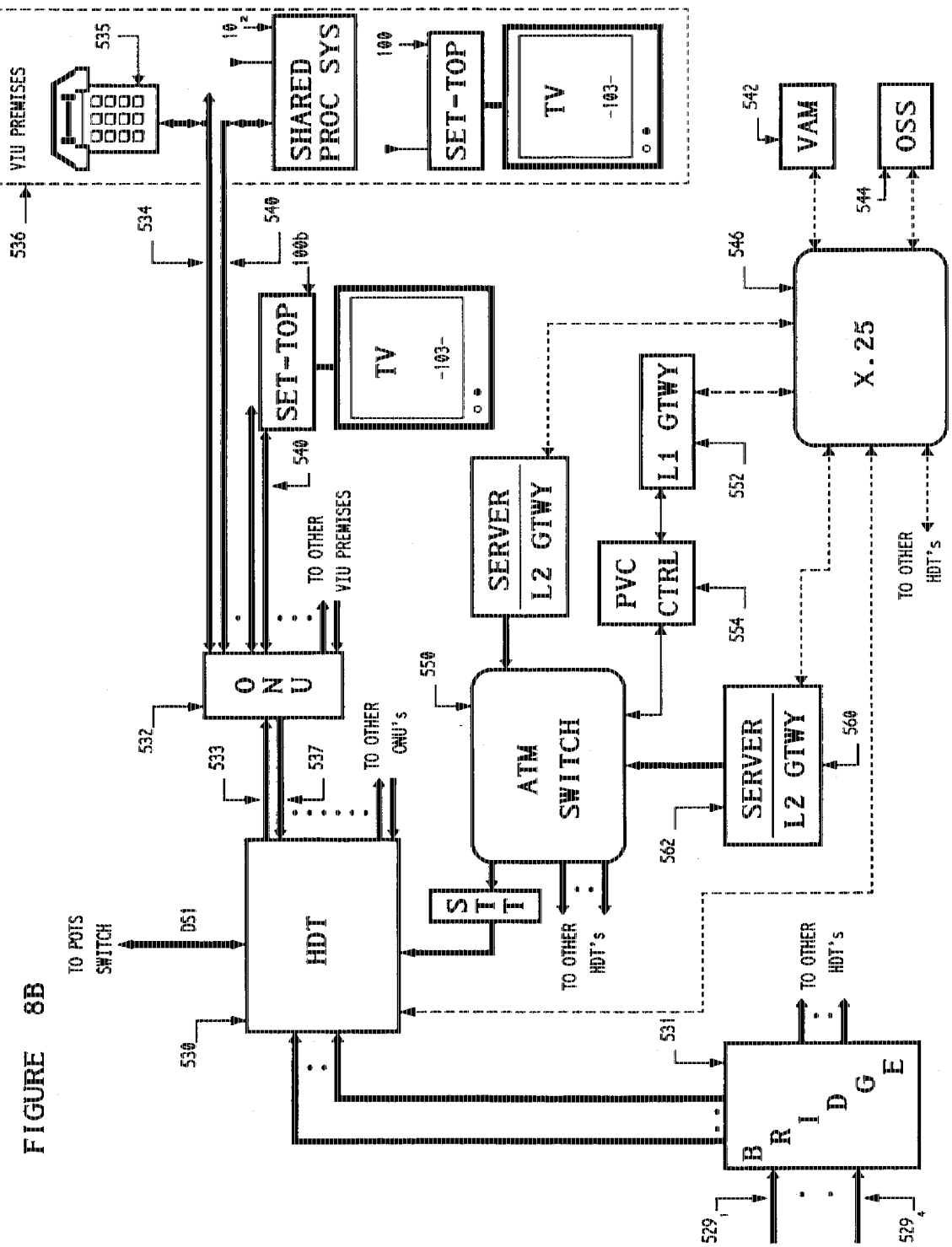

FIGS. 8A and 8B together show an example of a switched digital video type network connected to an on-premises distribution system in accord with the present invention. The illustrated network provides transport for broadband services including broadcast video and IMTV type services, such as video on demand. The network also provides interactive text services and voice telephone services.

The illustrated network comprises an ATM backbone network and a local loop network. For broadcast services, the ATM backbone network includes an ATM edge device 526 and optical fibers 520 from the VIP headends to that edge device. The ATM backbone network includes four optical fibers $529_1$ to $529_4$ carrying broadcast programming from the ATM edge device 526 to a large number of broadband host digital terminals (HDT's) 530 (only one of which is shown in FIG. 8B).

For interactive multimedia television (IMTV) services, the ATM backbone network includes at least one ATM switch 550. The ATM switch is controlled by a PVC controller 554. A subscriber wishing to initiate an IMTV session interacts with a level 1 gateway 552 which in turn communicates with the PVC controller 554 to obtain the requisite bandwidth through the switch 550 to the HDT 530 serving the particular subscriber.

The local loop network consists of the HDT's 530, two-way optical fiber pairs between the HDT's 530 and optical network units 532 (ONU's), and coaxial cables 540 and twisted wire pairs 534 connecting the ONU's to the subscriber premises equipment. Control processor elements (not shown) within the HDT's 530 and a video administration module (VAM) 542 control the broadcast services.

Signaling communications between the DET's 539 and the serving HDT 530 utilize a consumer electronics (CE) bus protocol. In the presently preferred embodiment, signaling communications between the other nodes of the network ride on an X.25 packet switched data network 546. In future implementations, instead of data network 546, the ATM switch 550 will carry the signaling traffic together with the IMTV broadband traffic.

For simplicity and ease of understanding, it is assumed here that the network is set up to transport broadcast services from two video information provider (VIP) headends. In practice there may be more than two broadcast VIP's on the network together offering at least 384 channels of broadcast programming. Each of the broadcast video headends includes one or more source systems 511. Each source system 511 digitally encodes up to six audio/video programs in MPEG II format. Each source system 511 includes an ATM multiplexer for adapting the MPEG packets into a single ATM stream at a DS3 rate.

In the illustrated example, each DS3 is actually a one-way asynchronous bit stream. The transmission of ATM cells in an asynchronous DS3 signal requires a common clock reference in order to ensure frame alignment between the ATM multiplexer and a super trunk transmitter (STT) 518. The ATM multiplexer in each source system 511 therefore presents the MPEG II packet channels in ATM cell format in accordance with a physical layer convergence protocol (PLCP). The PLCP is a framing structure used to ensure that ATM cells are aligned with respect to a corresponding video frame, even though there may exist drifting of a start and end of a typical DS3 frame. Specifically, the PLCP references a DS3 header and identifies the location of each ATE cell with respect to the DS3 header. Since the DS3 frame contains a maximum of twelve ATM cells, the PLCP notes the location of each of the twelve cells with respect to the DS3 header. Therefore, even though there may be DS3 frame drifting, the PLCP ensures alignment, from a cell perspective, between the cell layer and the DS3 frame so that each of the twelve ATM cells within each DS3 frame can be located.

All broadcast service type video information providers (VIP's) supply programming to the network in the form of a DS3 type, MPEG II encoded ATM streams such as that output by the source systems 511. The DS3 bit stream from each system 511 goes to one input of a super trunk transmitter (STT) 518. As discussed below, the STT 518 combines a number of DS3 ATM cell streams into one higher rate bit stream and converts the electrical signals to optical signals for transmission over a trunk fiber 520. One broadcast VIP may have a number of STT's 518, and the network will actually carry optical broadcast streams from multiple broadcast service VIP's.

If the optical transmissions are SONET compliant, the super trunk transmitters 518 and super trunk receivers 524 would operate at an OC rate to transport a standard number of DS3 bit streams. For example, OC-12 equipment will transport 12 DS3 bit streams, OC-18 will transport 18 DS3 bit streams, etc. It would also be possible to use an asynchronous optical protocol.

The preferred embodiment uses super trunk transmitters and receivers manufactured by Broadband Technologies, Inc. of Research Triangle Park, N.C. The preferred super trunk transmitters perform a bit stream interleave type multiplexing. The preferred super trunk transmitters (STT's) 518 are capable of receiving DS3 bit streams from up to sixteen sources, for example up to sixteen source systems 511. Each super trunk transmitter 518 interleaves those DS3 rate bit streams into a single higher rate bit stream, converts that electrical stream into an optical signal stream and transmits the optical stream over a fiber, such as 520. The optical fibers 520 each transport up to 16 DS3 streams, wherein each DS3 includes six 6 Mbits/s MPEG II encoded transport streams, for a maximum capacity on the fiber of 96 channels per fiber.

According to the preferred embodiment, the network includes a plurality of parallel trunk fibers 520 from different STT's 518 servicing a variety of VIPs. Each fiber 520 goes to a super trunk receiver (STR) 524. A different set of input broadcast broadband (e.g. television) signals are encoded and multiplexed in a manner similar to that discussed above to produce the combined 16 DS3 bit streams (up to 96 channels) for transport over each respective optical fiber 520. The network preferably will service up to 50 VIPs.

The trunk fibers 520 are routed to super trunk receivers 524, each of which recovers up to sixteen DS3 bit streams from the corresponding optical signal stream. Each super trunk receiver 524 supplies each recovered DS3 rate stream to one input node of the ATM edge device 526. The preferred ATM edge device 526 receives at least sixty-four DS3 inputs from the STRs 524. The ATM edge device 526 performs policing and grooming on the input ATM cell streams.

The ATM edge device 526 monitors incoming DS3 data streams and determines whether ATM cells within the data streams should be passed to the network or blocked. This functionality of the edge device 526 serves to police incoming cells based on their VPI/VCI values. The edge device will pass cells only if the VPI/VCI values in the cells correspond to a value indicated as valid in the data tables programmed into the edge device. If a cell does not have a valid VPI/VCI value for a currently active program channel, the edge device will not pass that cell to an output port.

Also, the ATM edge device 526 performs policing of DS3 ATM cell streams by monitoring the data rate of incoming data streams from VIPs. For example, if one VIP has subscribed by contract to transmit a particular channel at a data stream rate of 6 Mbits/s, the ATM edge device 526 will prohibit or drop ATM cells having the assigned VPI/VCI value that are transmitted above the subscribed bit rate; in this case, a 6.5 Mbits/s stream would be rejected as an unauthorized rate.

In addition, the ATM edge device 526 provides a grooming function, whereby ATM cells are analyzed, on a cell-by-cell basis, to determine if they should be transmitted on the network. Specifically, each ATM cell having a valid VPI/VCI value is switched through the ATM switch fabric assigned to carry the program identified by the VPI/VCI value. The ATM edge device 526 combines a specified six ATM cell streams into a DS3 bit stream for output on each DS3 output port.

This ATM cell mapping enables DS3 ATM cell streams that are transmitted at less-than-full capacity on the trunk fibers 520 to be mapped onto output DS3 streams operating at full capacity. Although each optical fiber 520 has a capacity of transporting up to 16 fully loaded DS3 ATM streams, at least one optical fiber 520 from two or more VIPs typically will not be operated at capacity, when broadcast VIPs do not offer an even multiple of six channels or when VIPs using the optical fibers have varying bandwidth requirements over time. The ATM edge device 526 processes all incoming DS3 bit streams from all of the optical fibers 520, and maps the ATM cell streams from those inputs into at least one and preferably sixty-four condensed, or combined DS3 output bit streams for further transmission through the network. Thus, the ATM edge device is able to fully load the optical fibers $529_1$ to $529_4$ serviced by the STT's $528_1$ to $528_4$ to fully load the downstream broadcast capacity of the network.

The ATM edge device 526 outputs each groomed DS3 stream to one input of a super trunk transmitter (STT) similar in structure and operation to the STTs 518 discussed above. In a preferred embodiment, each DS3 from the edge device 526 goes to one input of the four STR's $528_1$ to $528_4$. The preferred embodiment can carry up to 384 broadcast program channels over a capacity of 64 DS3 signal paths (four fibers $529_1$ to $529_4$ each carrying sixteen DS3's in a manner similar to the maximum possible on each fiber 520). In that embodiment, the STT's $528_1$ to $528_4$ receive the 64 DS3 ATM streams from the ATM edge device 526, and output the ATM streams over four parallel optical fibers. SONET or other protocols could be used on the fibers $529_1$ to $529_4$ and/or the network could include additional fibers.

The ATM edge device may comprise a relatively small capacity ATM switch. A more detailed description of the ATM edge device and its operation is disclosed in commonly assigned U.S. patent application Ser. No. 08/380,744 filed Jan. 31, 1995 entitled "Full Service Network Using Asynchronous Transfer Mode Multiplexing" (attorney docket no. 680-109), the disclosure of which is incorporated herein in its entirety by reference.

The ATM edge device 526 outputs at least one DS3 bit stream of combined ATM cell streams and preferably 16 such bit streams to each of the four super trunk transmitters (STT's) $528_1$ to $528_4$. Each particular STT $528_1$ to $528_4$ combines the input DS3 bit streams into an optical stream, in a manner similar to that of STTs 518, for transmission on one of the four fibers $529_1$ to $529_4$.

The signal stream on each optical fiber $529_1$ to $529_4$ is applied to a bridge circuit 531 (FIG. 8B) to supply the optical signal stream through corresponding trunk fibers to a large number of broadband Host Digital Terminals (HDT's) 530 distributed throughout the serving area. The bridge circuitry includes passive bridging elements and may include active bridging elements.

The preferred embodiment utilizes broadband HDTs manufactured by Broadband Technologies, Inc. of Research Triangle Park, N.C. Each HDT 530 switches DS3 bit streams carrying selected program channels onto optical fibers 533 to up to 32 optical network units 532 (ONUs). The ONUs 532 transfer the DS3's over respective coaxial cables to subscriber terminals for display on associated television sets.

The downstream optical fibers 533 from the HDT 530 to each connected ONU preferably transport 54 DS3 ATM cell streams, e.g. using OC-24 SONET compliant equipment. Together, the downstream fiber 533 and upstream fiber 537 also provide transport for 5-way telephone communications and 5-way signaling channels. In an alternate embodiment, the network might use a signal fiber between the HDT and each ONU and provide both downstream traffic and upstream traffic on that one fiber.

In the illustrated embodiment, the downstream optical fiber 533 from the HDT 530 to each ONU 532 may use either an asynchronous optical protocol, or the synchronous (SONET) OC rate transport. The ONU's 532 provide appropriate interfacing between the voice channels on the fibers and twisted wire pair 534 for telephone service into the subscriber premises.

Each video information user (VIU) premises 536 is preassigned three DS3 slots on the downstream fiber from the HDT 530 to the ONU 532 for broadband service. Each home or living unit 536 is preferably allocated a capacity of four set-top terminal devices 100 or 100b, with three terminal devices being independently active at any one time. A coaxial drop 540 for each premises 536 carries 180 Mbits/s baseband digital data, which will simultaneously transport three 45 Mbits/s DS3 bit streams. For a particular VIU premises 536, the three DS3 channels on the fiber from the HDT 530 to the ONU 532 and on the drop cable 540 are individually assignable to different set-tops 100 or 100b within the subscriber's premises 536. The ONU 532 performs optical to electrical conversion, separates out the DS3's received over the downstream optical fiber 533 from the HDT 530 and supplies the selected DS3 bit stream to appropriate channels on the coaxial cables 540 going to the respective subscriber premises 536.

For narrowband signaling information, the ONU 532 passes all of the downstream signaling data received from the HDT 530 on fiber 533 through to all of the coaxial drop cables 540, so that for signaling data the cables look like a common bus shared by all of the connected set-tops 100b and/or shared processing systems $10_2$. In the downstream direction, signaling packets are interleaved with the ATM cell stream packets. In the upstream direction, the signaling channel on the coaxial cable 540 is in a different frequency portion of the spectrum from the downstream DS3 transmissions. The ONU combines all of the upstream signaling packets from subscriber drop cables 540 into a digital data stream and transmits that data stream together with digitized upstream telephone service signals over the upstream fiber 537 to the HDT 530.

As in the network of FIG. 6, the network of FIGS. 8A and 8B services a large number of customer premises, some of which have in-home wireless distribution systems and some of which have terminals 100b directly connected to the drop cable 540. The wire connected terminals 100b again include a DET identical to the DET 102 shown in FIG. 4. The terminals 100b also include a network interface module (NIM) which provides the actual physical connection to the coaxial cable 540 and the two-way signal and protocol conversion between the signals on the network and those used by the DET, both for downstream broadband reception and for two-way signaling communication via out-of-band signaling channels.

Figure 9:
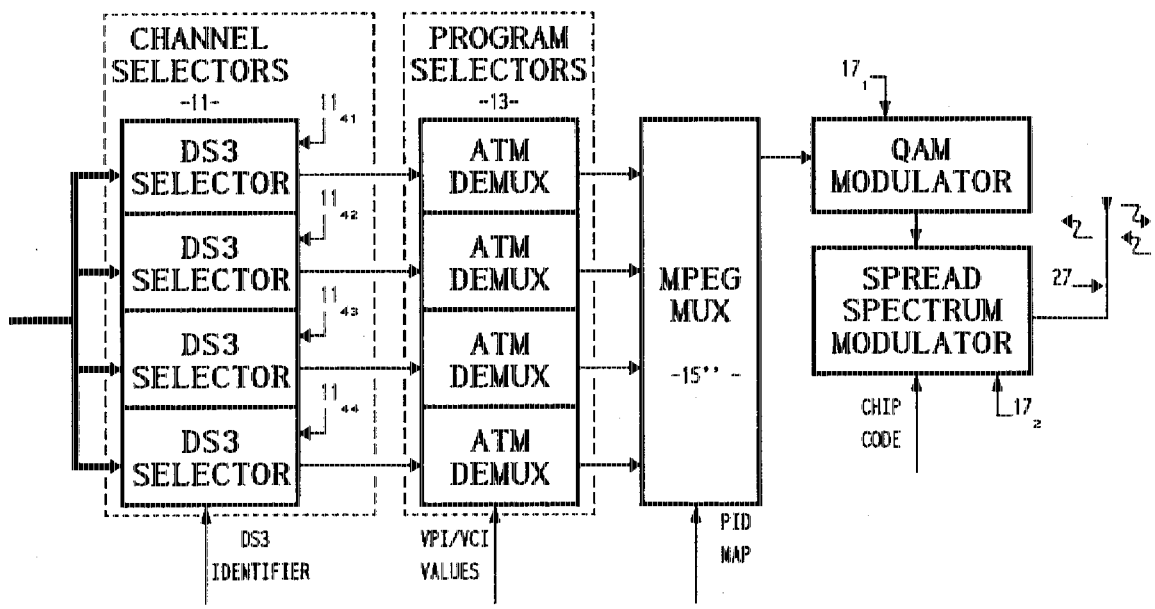
FIG. 9 is a simplified functional diagram showing the selection circuits, multiplexer and broadband modulator utilized in a shared processing system for use with the network of FIGS. 8A and 8B.

To facilitate understanding of the network of FIGS. 8A and 8B, the following discussion concentrates principally on a customer premises installation utilizing a physical connection of the terminal 100b to the subscriber's drop cable 540. After the discussion of the network in that context, a discussion of a specific implementation of the selection circuitry in the shared processing system $10_2$ with respect to FIG. 9 illustrates the wireless distribution type customer premises installation and operation thereof in accord with the present invention.

Each set-top 100b comprises a DET and NIM, as discussed above. In this embodiment, the TIM connects to the coaxial drop cable 540 to send control signals to the ONU 532 and receive video and data signals from the ONU 532. The NIM includes means to select and demodulate received data from an assigned one of the three DS3 slots on the coax cable 540 and an ATM demultiplexer for mapping ATM cells from a selected ATM virtual circuit in the DS3 back into the corresponding MPEG packets. As discussed above, the DET includes an MPEG II audio/video (A/V) decoder. Specifically, the ATM demultiplexer captures and processes ATM cells bearing specified VPI/VCI header information corresponding to the selected program from the DS3 stream. The MPEG II decoder in sequence reconstructs the frames for a particular program from packets bearing the appropriate PID value, decompresses the compressed digital video information, and displays the decompressed digital video information in the appropriate format. As discussed more fully below, in the wireless on-premises distribution system, the DS3 selectors and ATM demultiplexers serving four set-top terminals 100 are elements of the shared processing system $10_2$.

Each wire-connected set-top 100b includes means to receive selection signals from a user via remote control, and as noted above, the set-top responds by transmitting appropriate data signals over a narrowband signaling channel on the coaxial drop cable to the ONU 540. According to the preferred embodiment, the narrowband signaling channel uses X.25 or a consumer electronics (CE) bus protocol. With the CE bus protocol, for example, the active set-tops 100b and 100 are assigned signaling time slots by the HDT 530, and each active set-top 100b transmits channel selection data upstream to the ONU 532 in its assigned slot, and the shared processing system $10_2$ sends upstream data from the set-top terminals 100 in a similar manner.

The ONU 532 multiplexes the data signals from the set-tops 100b, 100 it services together and transmits those signals to the HDT 530 over an upstream channel on an optical fiber 537. If the data represents selection signals, the HDT 530 responds to that data as outlined above, and stores data identifying each subscriber's selections for subsequent periodic uploading to a Video Administration Module (VAM) 542. The HDT's 530 connect to the VAM through the X.25 packet data communication network 546.

The operations of each HDT 530 are controlled by data tables stored within the HDT. The video information providers (VIP's) provision various services for their subscribers by establishing appropriate mapping and profile data in the tables in the HDT's 530. The VIPs, however, do not have direct access to the data tables within the HDTs. Instead, the VIPs access the VAM 542 through a personal computer interface 544 and the X.25 data communication network 546. The VIPs 510 provide provisioning data through the operations and support system (OSS) 544 to the VAM 542, and the VAM 542 periodically downloads that data to the appropriate HDTs 530.

The provisioning data downloaded to the HDTs 530 includes channel mapping information and subscriber authorization control information. The channel mapping information specifies what programs are carried on each ATM virtual circuit, within each DS3, on each respective optical fiber $529_1$ to $529_2$. The HDT 530 accesses the channel mapping information in response to each program selection by a subscriber to route the correct DS3 to the requesting set-top 100, 100b and to inform the set-top 100b or the shared processing system $10_2$ as to which virtual circuit within that DS3 carries the requested program. The authorization control data indicates which programs each subscriber is authorized to access, e.g. because that party has subscribed to the particular program service and is not delinquent in bill payments. When a subscriber requests a program, the HDT 530 checks this data to determine whether or not to supply the program to the subscriber's set-top 100, 100b.

In operation, the network administration and support personnel enter VIP profile information including the VPI/VCI assignments in a database (not shown) and manipulate that database to define necessary routing tables for transport of the VIP's broadcast program channels through the network. The database then outputs appropriate information for programming the ATM edge device 526 and information for programming the VAM 542. The VAM 542 periodically updates the actual control tables in each HDT 530 via communications through the X.25 signaling network 546. In particular, the data downloaded to the HDTs 530 indicates the DS3's on each fiber. The data downloaded to the HDTs 530 also indicates the VPI/VCI values for each program channel within each DS3. In the preferred embodiment, the data in the HDT will also include an initial PID value used in capturing and decoding the MPEG II packets for each program channel, e.g. the PID value for the program map table (PMT) packet for the particular program.

Consider now the operation of wired connected set-top terminals, such as set-top 100b. Each time a subscriber turns on a set-top 100b, the set-top transmits an appropriate signaling message upstream to the HDT 530. The HDT stores a table of valid equipment ID's for the set-tops it services. The signaling message transmitted to the HDT 530 at turn-on includes the equipment ID for the particular set-top 100b. When the HDT 530 receives the initial signaling message from the set-top, the HDT executes a routine at to initialize the set-top. As part of this initialization routine, the HDT 530 validates the set-top equipment ID and assigns one of the DS3 slots on the downstream fiber 533 to the ONU 532 to that set-top for as long as that set-top remains on. Also, one of the DS3's on the subscriber's coaxial drop cable 540 from the ONU 532 is assigned to the set-top 100b for the duration of communications.

At the same time, the HDT 530 will complete a two-way signaling communication link with the DET in the particular set-top 100b. At least on the coaxial cable portion, the packets relating to the signaling link are identified by header information identifying the particular link, i.e. a signaling identifier assigned to this communication between the HDT 530 and the particular set-top 100b. As part of the initialization routine, the HDT 530 sends one or more signaling messages to the DET in set-top 100b identifying the signaling channel assignment and the DS3 assignment. Specifically, for the signaling link, the HDT 530 assigns the next idle signaling ID to this call and informs the DET of that signaling ID assignment.

When a subscriber turns on a wireless distribution set-top 100, that set-top signals the shared processing system $10_2$. The shared processing system $10_2$ informs the HDT 530, and the HDT 530 and shared processing system $10_2$ go through a sequence similar to that described above for set-top 100b, to assign a DS3 and a signaling channel to the set-top terminal 100.

When a subscriber at a hard-wired installation selects a broadcast program, the subscriber's set-top 100b transmits a channel request message, including the equipment ID of that set-top and channel selection information, upstream through the signaling link to the HDT 530. Using portions of the stored data tables, the HDT 530 checks to determine if the particular set-top is permitted to access the requested channel. The access decision may relate to whether or not the VIU has subscribed to the program service requested. Alternatively, the HDT 530 may execute a PIN/password routine to determine if the person currently operating the set-top is allowed access to the particular broadcast program service.

If the subscriber is permitted access to the requested channel, the HDT 530 switches the DS3 bearing the requested channel from one of the trunk fibers $529_1$ to $529_4$ onto the DS3 assigned to the requesting set-top 100b on the fiber 533 going to the ONU 532 serving the particular subscriber. The ONU 532 in turn switches the assigned DS3 on the fiber 533 onto the DS3 assigned to the particular set-top 100b on the drop cable 540 into the particular VIU's premises. The HDT 530 addresses a downstream control message to the set-top 100*b* using the assigned signaling call ID. The control message identifies the VPI/VCI of the requested program within the DS3 and the MPEG PID value for the MPEG program map table (PMT), so that the set-top 100*b* can select and begin decoding MPEG II transport packets for the selected program to produce standard signals for driving a television set 103.

When a user at premises 536 selects a program, the shared processing system 10$_2$ sends the selection information to the HDT 530, and the HDT 530 switches through the appropriate DS3 and provides the PMT PID to the shared processing system 10$_2$, in the same manner as for the set-top terminal 100*b*. The shared processing system selects the DS3 and the program from the DS3, multiplexes a plurality of programs, and transmits the multiplexed stream to the set-top terminals 100 for decoding as in the earlier embodiments.

As noted above, the HDT 530 switches DS3's and instructs the set-top 100*b* or the shared processing system 10$_2$ what VPI/VCI values to use to capture cells for particular programs. The set-top 100*b* or shared processing system 10$_2$ processes an assigned one of the three DS3 signals carried on the coaxial cable into the VIU's premises 536; and from that DS3, the set-top 100 or shared processing system 10$_2$ captures cells having the VPI/VCI value that the HDT instructed it to capture. When a subscriber wants to switch programs, if the newly selected channel is in the DS3 stream already going to the set-top 100*b* shared processing system 10$_2$, the HDT 530 provides the set-top 100*b* or shared processing system 10$_2$ with the new VPI/VCI value and PID value for the newly selected program. The set-top 100*b* or shared processing system 10$_2$ can begin immediately capturing and processing cells bearing the new VPI/VCI and decoding payload data from those cells to present the program in the usual manner. If the selected channel is not in the DS3 currently assigned to the particular set-top 100, 100*b*, then the HDT 530 will switch the DS3 for the new channel from the correct incoming optical fiber onto the DS3 assigned to the set-top on the fiber 533 to the ONU 532. The ONU 532 supplies that new DS3 via the currently assigned DS3 slot on the subscriber's coaxial drop cable 534 so that the set-top 100*b* or shared receiving system 10$_2$ will begin receiving the new DS3. Through the downstream signaling channel, the HDT 530 also informs the set-top 100*b* or shared receiving system 10$_2$ of the new VPI/VCI to permit capture and processing of cells and decoding payload data from those cells to present the newly selected program to the user via the television set, in the above discussed manner.

The presently preferred network embodiment also provides transport for interactive broadband services such as video-on-demand and software downloading through point-to-point connections in accord with the disclosure of the Ser. No. 08/250,791 parent application. Typically, the network carries such services offered by two or more IMTV VIP's. As shown in FIG. 8B, an ATM switch 550 provides a bit stream carrying one or more DS3's containing ATM cell streams to each HDT 530, to provide point-to-point connections for such services. As discussed in more detail below, the access through this switch 550 is controlled by the Level 1 Gateway (L1 GTWY) 552.

Each non-broadcast or IMTV service provider preferably has a Level 2 Gateway (L2 GTWY) 560 and some form of file server 562. Typically, the VIP will store volumes of MPEG II encoded material in a variety of memory devices which form the server. An IMTV VIP's equipment preferably outputs ATM cell streams, encoded in the manner discussed above with regard to FIG. 8A, to the ATM switch 550 for transmission through the network. Alternatively, if the provider's equipment transmits only MPEG II bit stream data, the network operator would supply an ATM multiplexer to convert the service provider's bit stream data into a DS3 containing one or more ATM cell streams compatible with the network. The ATM switch 550 transmits selected ATM cells on the one or more DS3 streams through an STT and an optical fiber going to the HDT 530 serving a particular VIU who requested a session with the particular IMTV VIP. As part of its routing operations, the ATM switch 550 performs policing and grooming functions of the type performed by the ATM edge device 526.

To establish a broadband communication session or connection through the network between an interactive information service provider 510' and a particular set-top 100 or 100*b* requires establishment of a virtual circuit through the ATM switch 550 and the appropriate HDT 530. In the network of FIGS. 8A and 8B, a PVC controller 554 stores data tables defining all possible virtual circuits through the ATM switch 550 to the HDT's 530. These data tables define the header information and the particular fiber output port used to route cells to the correct HDT 530. The data tables thus define "permanent virtual circuits" (PVC's) between the providers and the set-top terminal devices. The PVC controller includes current VPI/VCI data available to each VIP and an ongoing record of which VPI/VCI values are in use. Thus, at any given time the PVC controller 554 knows what VIP/VCI values are available and can be assigned dynamically to provide requested bandwidth for each new IMTV session.

The following discussion of call set-top concentrates on a set-top for a wire connected set-top terminal 100*b*. It will be readily apparent, however, that the shared processing system 10*b* provides the DS3 and virtual circuit selection and the two-way signalling communication between a wireless set-top terminal 100 and the network to facilitate an identical connection set-up procedure through the network to the IMTV VIP's equipment.

When a subscriber initiates a session with a broadband interactive service provider, the subscriber's set-top 100*b* for example provides an appropriate "off-hook" signal to the HDT 530. The HDT 530 sends the message through the X.25 packet switched network 546 to the Level 1 Gateway (L1 GTWY) 552. When the Level 1 Gateway 552 receives the addressed message from the HDT 530, that Gateway uses the billing number ID of the set-top included in the message to check its internal database to determine if the caller is a valid network customer. If the caller is not a valid customer, the system tears downs the session. If the caller is a valid customer, the Level 1 Gateway 552 transmits a call accept message back to the set-top terminal 100*b* and waits for the first application level message. Once the call is accepted, an X.25 signalling link is provided between the HDT 530 and the Level 1 Gateway 552 for purposes of carrying signaling information between the set-top 100*b* and that Gateway, and the HDT 530 internally associates that signaling call with the signaling call over the fibers 533, 537 and the coaxial cable 540, i.e. the signaling link set up from the HDT 530 through the ONU 53 to the set-top 100*b* when the user turned on the set-top terminal.

The set-top 100*b* next sends an initiation or 'hello' message to the Level 1 Gateway 552 that includes basic information including the set-top ID and a set-top type designation. The Level 1 Gateway 552 interacts with the subscriber through the set-top 100*b* to obtain a selection identifying one of the IMTV services providers.

The Level 1 Gateway 552 may execute a PIN number access routine, if the subscriber has previously requested such access control for selected ones of the VIP's. For simplicity here, it is assumed that the currently selected VIP is not subject to such a PIN number requirement. The Level 1 Gateway 552 is merely expecting to receive the VIP selection input from the set-top 100b, e.g. in response to a menu display, within a predetermined period following the menu transmission. If the Level 1 Gateway 552 receives the selection input message from the set-top 100b within the predetermined period, the Level 1 Gateway 552 translates that message into the 4 digit code for the selected VIP's Level 5 Gateway 560.

Once the selection of the VIP is complete, the Level 1 Gateway 552 then goes over the X.25 network 546 to communicate with the selected VIP's Level 5 Gateway 560 and indicates that it has a customer calling. The Level 1 Gateway 552 identifies the customer to the Level 5 Gateway 560 by sending the 10-digit billing number for the calling set-top 100b. The Level 1 Gateway 552 also transmits set-top identification information and set-top type information for the particular set-top 100b to the Level 2 Gateway 560. The VIP's Level 2 Gateway 560 may accept or reject the call after receiving the initial request indicating availability of the identified customer. If accepted, the Level 2 Gateway 560 sends a message back to the Level 1 Gateway 552 indicating acceptance of the call and provides the Level 1 Gateway 552 with a server output port identification for the port on the server 562 which will service the broadband call. The Level 2 Gateway 562 may also indicate that one of a plurality of VPI/VCI values assigned to this VIP should be allocated to this particular session.

In response, the Level 1 Gateway 552 transmits the X.121 address of the HDT serving the calling customer's set-top 100b to the Level 2 Gateway 562. The Level 2 Gateway 562 uses that address to initiate a new signaling communication through the X.25 network and the HDT 530 to the set-top 100b. As part of that call, the Level 2 Gateway identifies the set-top to the HDT 530, e.g. by sending the billing ID of the set-top to the HDT. The signaling call to the level 1 gateway 552 is taken down when Level 2 Gateway initiates its signaling call, after which the HDT 530 associates the new X.25 signaling call from the Level 2 Gateway 562 with the established signaling call between the HDT 530 and the calling subscriber's set-top 100b and performs any necessary protocol conversion. For example, the HDT places downstream signaling data from the X.25 call in packets identified with the signaling call ID assigned to the subscriber's set-top 100b at turn-on and transmits those packets through the downstream fiber 533 to the ONU 532 and the coaxial cable 540 to the subscriber's premises 536.

The Level 1 Gateway 552 interacts with the PVC controller 550 to obtain the bandwidth through the ATM switch 550. The Level 1 Gateway 552 advises the PVC controller 554 of the server port identification. The Level 1 Gateway 552 may advise the PVC controller 554 of the VPI/VCI value if such was assigned to the session by the Level 5 Gateway 562. Alternatively, the Level 1 Gateway 552 may obtain a VPI/VCI for the call from internal data or from the PVC controller 554, and then the Level 1 Gateway 552 supplies the assigned VPI/VCI to the Level 5 Gateway 562. The Level 1 Gateway 552 also informs the HDT 530 of a DS3 and VPI/VCI value on the fiber from the ATM switch 550 to the HDT 530 which is assigned to this broadband interactive call. If the ATM switch 550 translates the VPI/VCI values, the HDT 530 may specify the VPI/VCI value assigned to this broadband call on the DS3 on fiber to HDT 530. Alternatively, the level 1 gateway 552 or the PVC controller 554 may administer the VPI/VCI on that fiber and provide this value to the HDT 530.

The HDT 530 switches the identified DS3 from the fiber from the ATM switch 550 to the DS3 assigned to the subscriber's set-top on the fiber 533. The HDT 530 also transmits a signaling message to the set-top 100b indicating the correct VCI/VPI for the cells carrying the downstream broadband transmissions. The HDT 530 may also provide the DET with an initial PID value for use in decoding MPEG packets for the session. Alternatively, the Level 2 Gateway and server may first download software to the set-top via the ATM virtual circuit, and if so, the software would include the PID value. The set-top 100b will process the ATM cells and decode MPEG data carried in those cells in a manner similar to the processing of broadcast service cells, discussed above. This procedure establishes a virtual circuit through the network as a logical point-to-point communication link between the selected IMTV VIP's equipment and the calling set-top 100b.

During the interactive communication session between the subscriber and the IMTV VIP, the set-top 100 can transmit control signalling upstream through the ONU 532, the HDT 530 and the X.25 data network to the level 5 gateway 560. The level 2 gateway 560 can also send signaling information, such as control data and text/ graphics, downstream through the same path to the DET 538 or preferably as user data inserted in the MPEG II broadband data stream. For downstream transmission, the server 562 and/or an associated interworking unit (not shown) will provide ATM cells with an appropriate header. The ATM switch 550 will route the cells using the header and transmit those cells to the HDT 530 serving the requesting subscriber 536. The HDT 530 will recognize the header as currently assigned to the particular set-top 100b and will forward those cells through the downstream fiber and the ONU 532 to that set-top, in essentially the same manner as for broadcast programming.

The Full Service Network illustrated in FIG. 8A and 8B will also provide narrowband transport for voice and narrowband data services. A digital switch or an analog switch (not shown) will provide standard type plain old telephone service (POTS) for customers of the Full Service Network. The digital POTS switch provides a DS1 type digital input/ output port through interfaces conforming to either TR008 or TR303. The DS1 goes to the HDT 530. The DS1 may go through a digital cross-connect switch (DCS) for routing to the various HDT's or directly to a multiplexer (not shown) serving a particular HDT 530. The multiplexer may also receive telephone signals in DS1 format from an analog switch through a central office terminal. The central office terminal converts analog signals to digital and digital signals to analog as necessary to allow communication between the analog switch and the rest of the network.

Although not shown, the telephone service multiplexer for an HDT 530 may multiplex a number of DS1 signals for transmission over one fiber of an optical fiber pair to the HDT 530 and to demultiplex signals received over the other fiber of the fiber pair. The fiber pairs between the HDT 530 and the ONU's 532 will also have a number of DS1 channels to carry telephone and narrowband data signals to and from the subscriber's premises. In addition to the video services discussed above, the ONU 532 will provide telephone signals and appropriate power to the subscribers' premises over the twisted wire pairs 534 connected to subscribers' telephone sets 535.

FIG. 9 provides a block diagram functional illustration of the channel selectors, program selectors, multiplexer and broadband modulator utilized in a shared processing system 102 connected to the network of FIGS. 8A and 8B. As discussed above, the network of FIGS. 8A and 8B provide three DS3s carrying broadband information in multiplexed ATM virtual circuits over the coaxial cable drop into the subscriber's premises. In this embodiment of the wireless distribution system, the channel selectors comprise four DS3 selectors $11_{41}$ to $11_{44}$, one for each of the set-top terminals 100 serviced by the shared processing system $10_2$. Because the network supplies only three DS3s, at any given time, two of the selectors $11_{41}$ to $11_{44}$ will select the same DS3 channel. The program selectors in this embodiment comprise ATM demultiplexers, and each of the selectors $11_{41}$ to $11_{44}$ supply one DS3 bit stream to one of the ATM demultiplexers. As discussed above, the network allocates one DS3 to each set-top terminal at turn-on. The network provides the DS3 allocation information to the controller 19, and the controller provides appropriate control signals to the DS3 selectors $11_{41}$ to $11_{44}$.

In response to program selections, the HDT 530 provides VPI/VCI values to the controller 19 (FIG. 1). In this embodiment, the controller 19 (FIG. 1) supplies VPI/VCI information to each ATM demultiplexer to select one of the ATM virtual circuits within the respective DS3 bit stream. In response, each ATM demultiplexer performs a reverse adaptation on the cells identified by the VPI/VCI value to reconstruct MPEG II packets therefrom. Each ATM demultiplexer supplies an MPEG packet stream to one or four inputs to an MPEG multiplexer 15".

It will be recalled that in the earlier embodiment, the MPEG multiplexer 15' packetized the MPEG bit streams and combined the resultant packets into one transport stream. In this embodiment, the multiplexer 15" receives packet streams already in MPEG II format. The multiplexer 15" does not packetize the streams, the multiplexer 15", however, may check and modify PID values in the packets to insure that the identifiers in the resultant stream are unique and/or conform to PID assignments within the wireless on-premises system (see FIGS. 3A and 3B). The multiplexer 15" also constructs and inserts the program association table and program map tables (if necessary) as in the earlier embodiment. If the multiplexer 15" changes the PID values, the controller 19 uses the PMT value received from the HDT 530 and the PID values from the PMT to provide appropriate mapping instructions to the multiplexer 15". If the multiplexer does not modify the PIDs, then the controller 19 forwards the PMT PID value over the wireless signaling data link to the set-top terminal 100.

The MPEG multiplexer 15" supplies the resultant MPEG II super transport stream to a QAM modulator $17_1$ and a spread spectrum modulator $17_2$, exactly as in the embodiment of FIG. 7. The elements of the shared processing system $10_2$ not shown in FIG. 9 are identical to elements shown in the embodiment of FIG. 7, except that the modem 25 would utilize signal formatting and modulation in conformance to the network of FIGS. 8A and 8B rather than QPSK as in the FIG. 6 embodiment.

To the network of FIGS. 8A and 8B, the operation of the terminals 100 in the wireless premises distribution system appears identical to that of a wire connected terminal, discussed above. The shared processing system $10_2$ provides a channel selection directly analogous to that performed in the NIMs of four of wire connected terminals and relays a multiplexed broadcast of selected program signals to the actual set-top terminals 100. The shared processing system provides two-way out of band signaling through the network and provides two-way wireless signaling to the set-tops 100 utilizing the transceiver 21 (see FIG. 1).

For example, to select a program, one of the terminals 100 will supply a selection request message to the controller 19 using a wireless signaling data transmission. The controller 19 forwards that request together with an identification of the terminal 100 upstream to the HDT 530. The HDT 530 switches the DS3 on one of the fibers $529_1$ to $529_4$ onto the DS3 going to the subscriber's premises which has been assigned to the requesting terminal. The HDT 530 also provides the VPI/VCI value of the virtual circuit in that DS3 and a PID value to the controller 19 through the signaling channel on fiber 533 and drop cable 540.

Based on a DS3 identification provided during initialization, the controller 19 instructs one of the DS3 selectors to supply the DS3 assigned to the terminal to the corresponding ATM demultiplexer. The controller 19 also supplies the VPI/VCI value to the demultiplexer. In response, the demultiplexer processes cells having the specified VPI/VCI value to selectively reconstruct MPEG II packets therefrom. The ATM demultiplexer in turn supplies the MPEG II packets to the MPEG multiplexer for processing and transmission thereof to the terminal 100 in the manner outlined above. Similar procedures are used to route information from an allocated ATM virtual circuit relating to an interactive session through the on-premise system to a terminal engaged in an IMTV session.

Persons skilled in the art will recognize that the present invention is open to numerous modifications. For example, the shared processing system $10_1$ of FIG. 7 could actually utilize NIMs, identical to that in the terminal $100a$, in place of the individual channel selector components. In a four terminal implementation, the selectors 11 would comprise four NIMs. In such a configuration, the broadband output of each NIM would connect to one of the MPEG demultiplexers. The controller 19 would connect to the NIM/DET interface of each of the NIMs. The four NIMs would also provide the capability for four out-of-band signaling links through the network 5 and eliminate the need for the separate QPSK modem 251.

Also, changes in the encoding rates on the network 5 and/or the modulation techniques used in the digital modulator $17_1$ will change the number of set-top terminals 100 that one shared processing system 10 can service. For example, if the network 5 supplies programs at a 1.5 Mbits/s rate, sixteen such programs can be combined with associated overhead and forward error correction information into one 30 Mbits/s stream for 64 QAM modulation and broadcast. In such an implementation, one shared processing system 10 could service up to sixteen terminals 100 at the same time. The number of programs carried and the number of terminals serviced can also be increased by using certain other digital modulation techniques, such as 256 QAM or 16 VSB.

The above detailed discussion of the wireless distribution system assumed that one set of selectors 11, 13 was provided for each set-top terminal 100 serviced by the system. In such an implementation, all terminals may be active at the same time. Particularly where the system broadcasts a larger number of programs (e.g. sixteen), however, there will be many times when more than one terminal is receiving the same program. Also, there are many times when not all of the terminals are simultaneously active. The system 10 may service more terminals by dynamically allocating the selected program capacity in the broadcast transport stream, e.g. by dynamically assigning PID values. The controller 19 might assign PID value(s) to each terminal at turn-on. The controller 19 also might provide the same PID value to multiple terminals to permit those terminals to receive the same packets for a single program for simultaneous presentation via separate television sets.

While this invention has been described in connection with what is presently considered to be the preferred embodiment, it is to be understood that the invention is not limited to the disclosed embodiment, but, on the contrary, is intended to cover various modifications and equivalent arrangements included within the spirit and scope of the appended claims.

We claim:

1. A wireless customer premises distribution system receiving a plurality of multiplexed channels, each multiplexed channel containing a digitally multiplexed data stream including digitized broadband information relating to a plurality of programs, the distribution system comprising:
   a shared processing system comprising:
   (1) a plurality of channel selectors, each of which selects one of the received multiplexed channels,
   (2) a plurality of program selectors, each of which selects digitized broadband information relating to a selected program from a channel selected by one of the channel selectors,
   (3) a multiplexer multiplexing the selected digitized broadband information from the program selectors into a digital transport stream, and
   (4) a transmitter for wireless broadcast of the digital transport stream; and
   a plurality of terminal devices responsive to the wireless broadcast of the digital transport stream for processing selected digitized broadband information from the digital transport stream to present information relating to a selected program.

2. A distribution system as in claim 1, wherein each of the channel selectors comprises an RF channel tuner.

3. A distribution system as in claim 2, wherein each of the channel selectors further comprises a digital receiver for demodulating signals from a channel selected by one of the RF channel tuners to capture the digitally multiplexed data stream contained therein.

4. A distribution system as in claim 2, wherein each of the program selectors comprises a packet demultiplexer.

5. A distribution system as in claim 1, wherein each of the channel selectors comprises a digital time division multiplexed channel selector.

6. A distribution system as in claim 5, wherein each of the digital time division multiplexed channel selectors comprises a DS3 selector.

7. A distribution system as in claim 5, wherein each of the program selectors comprises a virtual circuit selector.

8. A distribution system as in claim 7, wherein each of the virtual circuit selectors comprises an Asynchronous Transfer Mode (ATM) demultiplexer.

9. A distribution system as in claim 1, wherein the multiplexer comprises a time division packet multiplexer.

10. A distribution system as in claim 9, wherein the time division packet multiplexer comprises an MPEG compliant multiplexer.

11. A distribution system as in claim 1, wherein the transmitter comprises a digital modulator and an RF modulator.

12. A distribution system as in claim 11, wherein the digital modulator comprises a QAM modulator, and the RF modulator comprises a spread spectrum modulator.

13. A distribution system as in claim 1, further comprising:
   a signaling data receiver receiving selection requests from the terminals; and
   a controller responsive to the selection requests for providing instructions to the channel selector and the program selector.

14. A distribution system as in claim 13, wherein the signaling data receiver receives wireless data transmissions from the terminals.

15. A distribution system as in claim 1, wherein at least one of the terminals comprises:
   a transport interface module for receiving the wireless broadcast and capturing the digital transport stream therefrom; and
   a digital entertainment terminal responsive to the captured digital transport stream for processing selected digitized broadband information from the transport stream to present information relating to a selected program to a user in humanly perceptible form.

16. A distribution system as in claim 15, wherein the transport interface module comprises an RF channel tuner.

17. A distribution system as in claim 16, wherein the RF channel tuner comprises a spread spectrum tuner.

18. A distribution system as in claim 15, wherein the digital entertainment terminal comprises:
   an audio/video processor responsive to selected compressed, digital audio and video information contained in the captured transport stream to produce signals for driving an audio/video display device; and
   a control processor controlling operations of the audio/video processor and the transport interface module.

19. A distribution system as in claim 18, wherein the audio/video processor comprises:
   an audio/video decoder for decompressing the compressed, digital audio and video information to produce a decompressed video signal and a decompressed audio signal;
   a graphics overlay controller, controlled by said control processor, for generating graphic display information; and
   means for combining the graphic display information with the decompressed video signal.

20. A distribution system as in claim 19, wherein the audio/video processor further comprises output means responsive to a signal from the means for combining and the decompressed audio signal for producing at least one output signal for driving a television receiver type audio/video display device.

21. A distribution system as in claim 18, wherein the audio/video processor comprises:
   an MPEG video decoder;
   an MPEG audio decoder; and
   an MPEG demultiplexer for selectively routing MPEG encoded video and audio packets carried in the captured transport stream to the MPEG video decoder and the MPEG audio decoder, respectively.

22. A communication system comprising:
   a digital broadband network carrying a plurality of multiplexed channels, each multiplexed channel containing a digitally multiplexed data stream including digitized programs;
   a shared processing system receiving a plurality of the multiplexed channels from the digital broadband network, said shared processing system comprising:
   (1) a plurality of channel selectors, each of which selects one of the received multiplexed channels,
   (2) a plurality of program selectors, each of which selects digitized broadband information relating to a selected program from a channel selected by one of the channel selectors,
   (3) a multiplexer multiplexing the selected digitized broadband information from the program selectors into a digital transport stream, and
   (4) a transmitter for wireless broadcast of the digital transport stream; and a plurality of terminal devices responsive to the wireless broadcast of the digital transport stream for processing selected digitized broadband information from the digital transport stream to present information relating to a selected program.

23. A communication system as in claim 22, wherein the digital broadband network comprises:

at least one packet multiplexer for multiplexing digitized broadband information relating to groups of programs into a plurality of transport streams;

a plurality of modulators, each modulator modulating one transport stream from the at least one packet multiplexer into one of the multiplexed channels;

a channel multiplexer for multiplexing the channels together; and a system for broadcasting the multiplexed channels.

24. A communication system as in claim 23, wherein the system for broadcasting comprises a hybrid-fiber-coax network.

25. A communication system as in claim 23, wherein each of the plurality of modulators comprises a QAM modulator.

26. A communication system as in claim 23, further comprising a point-to-point switched backbone network selectively supplying digitized broadband information from a server to the at least one packet multiplexer as a program of one of the groups.

27. A communication system as in claim 26, wherein the point-to-point switched backbone network comprises at least one Asynchronous Transfer Mode (ATM) switch.

28. A communication system as in claim 22, wherein the digital broadband network comprises:

a first optical fiber carrying said multiplexed channels from at least one source system;

a host digital terminal connected to the first optical fiber for selectively supplying multiplexed channels from the first optical fiber to a group of customer premises in response to selection requests from a group of user terminals, said shared processing system and at least one terminal device being located on one customer premises within the group of customer premises.

29. A communication system as in claim 28, wherein the digital broadband network further comprises a second optical fiber connected to the host digital terminal carrying digital point-to-point transmissions from a backbone network, wherein the host digital terminal selectively supplies digital point-to-point transmissions from the second optical fiber to the shared processing system.

30. A communication system as in claim 28, wherein the digital broadband network further comprises a plurality of optical network units connected by optical fiber to the host digital terminal, each optical network unit being connected by a cable to a subset of the group of customer premises.

31. A communication method comprising: receiving a plurality of multiplexed channels, each multiplexed channel containing a digitally multiplexed data stream including digitized broadband information relating to a plurality of programs;

simultaneously selecting a plurality of the received multiplexed channels;

from each selected channel, selecting digitized broadband information relating to a selected program;

multiplexing the selected digitized broadband information into a digital transport stream;

wirelessly broadcasting the digital transport stream; and at one of a plurality of terminal devices within range of the wireless broadcast, processing selected digitized broadband information from the digital transport stream to present information relating to a selected program to a user in humanly perceptible form.

* * * * *